United States Patent
Ide et al.

(10) Patent No.: US 7,864,240 B2
(45) Date of Patent: Jan. 4, 2011

(54) IMAGING APPARATUS IN WHICH AN ENLARGEMENT OF A LIVE PICTURE DISPLAYED IS BASED ON A DETERMINED IN-FOCUS EVALUATION VALUE

(75) Inventors: Masataka Ide, Hachioji (JP); Hisayuki Matsumoto, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 532 days.

(21) Appl. No.: 11/903,293

(22) Filed: Sep. 20, 2007

(65) Prior Publication Data
US 2008/0074531 A1    Mar. 27, 2008

(30) Foreign Application Priority Data
Sep. 22, 2006   (JP)   ............................... 2006-257621

(51) Int. Cl.
*H04N 5/232* (2006.01)
(52) U.S. Cl. .................. 348/347; 348/349; 348/208.12; 348/240.2
(58) Field of Classification Search ................. 348/345, 348/349, 346, 208.6, 208.12, 240.99, 240.2, 348/347
See application file for complete search history.

(56) References Cited

U.S. PATENT DOCUMENTS

| 5,604,562 A | * | 2/1997 | Aoyama | ...................... 396/79 |
| 2005/0031330 A1 | * | 2/2005 | Nonaka et al. | ............... 396/104 |

FOREIGN PATENT DOCUMENTS

| JP | 11-341331 | 12/1999 |
| JP | 2004-242009 | 8/2004 |
| JP | 2004242009 A | * | 8/2004 |

* cited by examiner

*Primary Examiner*—Jason Chan
*Assistant Examiner*—Usman Khan
(74) *Attorney, Agent, or Firm*—Straub & Pokotylo; John C. Pokotylo

(57) ABSTRACT

There is disclosed an imaging apparatus for displaying a live view image, in which an enlargement ratio of the live view image dynamically changes according to changes in in-focus state of a subject.

9 Claims, 15 Drawing Sheets (1)  L1

(4)  L5

(2)  L2

(5)  L6

(3)  L3

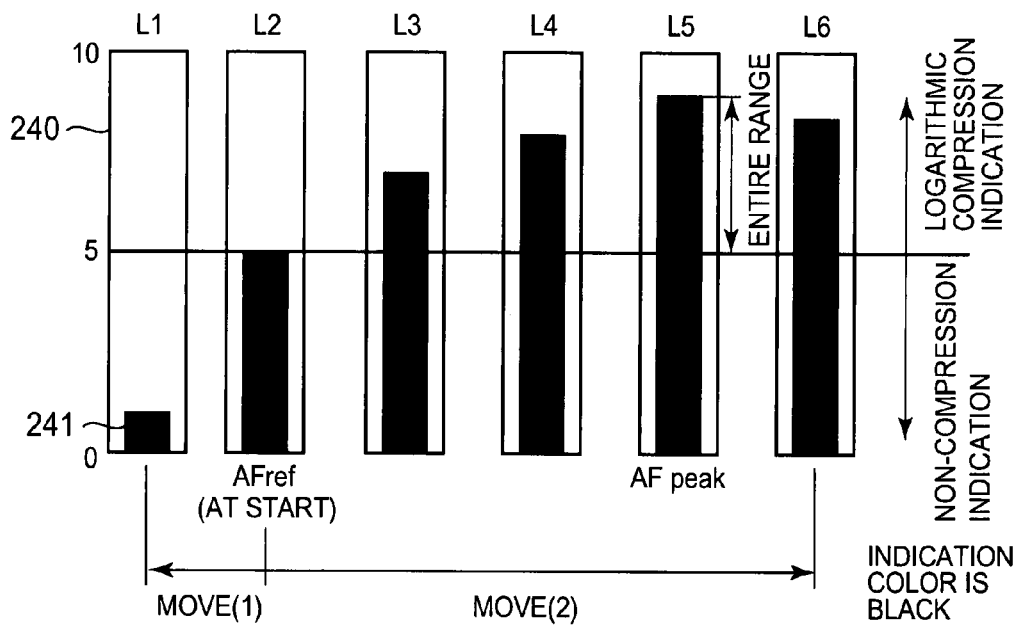
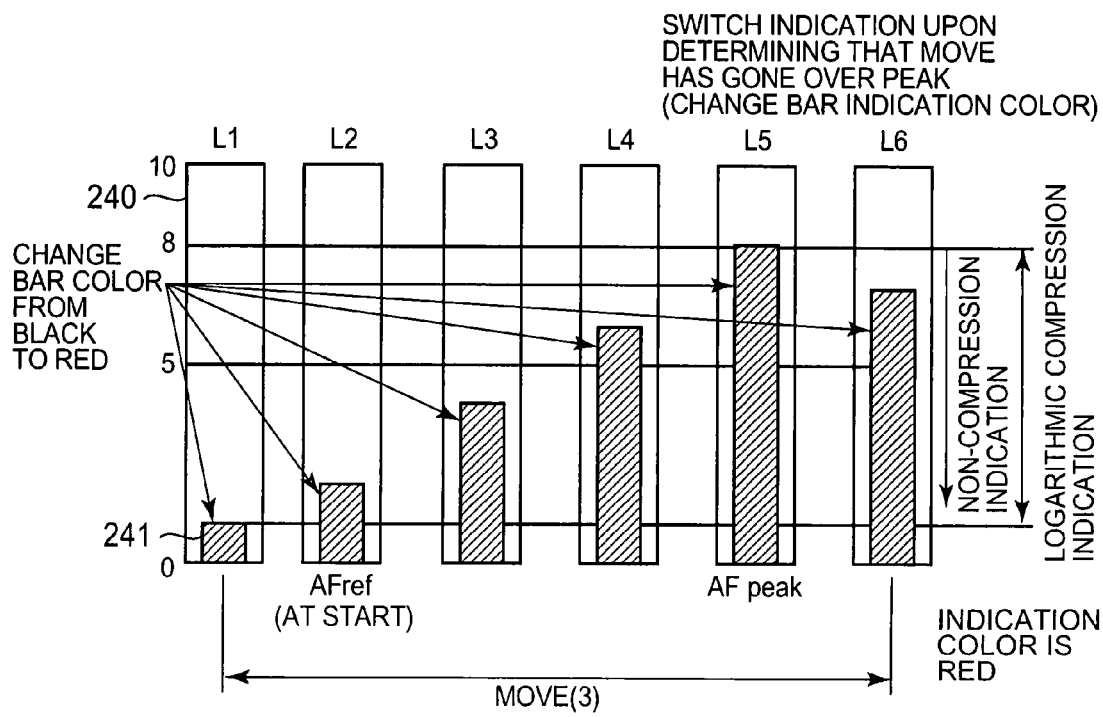

(1)      L1

(2)      L2

(3)      L3

(4)      L5

(5)      L6 ical system according to the first embodiment of the present
IMAGING APPARATUS IN WHICH AN ENLARGEMENT OF A LIVE PICTURE DISPLAYED IS BASED ON A DETERMINED IN-FOCUS EVALUATION VALUE

CROSS-REFERENCE TO RELATED APPLICATION

This application is based upon and claims the benefit of priority from prior Japanese Patent Application No. 2006-257621, filed on Sep. 22, 2006, the entire contents of which are incorporated herein by reference.

BACKGROUND OF THE INVENTION

1. Field of the Invention

The present invention relates to an imaging apparatus, and particularly to an imaging apparatus having a function for zooming in and displaying an image during manual focusing.

2. Description of the Related Art

Conventionally, there has been known a so-called live view display for showing a live picture of a subject, or a camera capable of displaying an acquired image shot on a display part such as an LCD device (Liquid Crystal Display). With such a camera, there are known, for example, the following techniques for making the focusing operation easy during manual focusing (hereinafter abbreviated as "MF").

Japanese Patent Application Laid-Open No. 11-341331 discloses an imaging apparatus which provides, on a display part, a live view display of a subject more zoomed in at a predetermined-magnification during MF than during autofocus (hereinafter abbreviated as "AF").

Japanese Patent Application Laid-Open No. 2004-242009 discloses an imaging apparatus which zooms in the most in-focus area in a shot image screen and displays the zoomed-in area image on a display part during live view display in the MF mode.

BRIEF SUMMARY OF THE INVENTION

The imaging apparatus of the present invention displays a live view image whose enlargement ratio dynamically changes according to changes in in-focus state of a subject.

An exemplary structure of the present invention can be expressed as an imaging apparatus for imaging a subject, comprising: a shooting optical system for forming an image of a light beam from the subject; an imaging part for capturing images of the subject at predetermined intervals to output a moving image; a display part for displaying, on a display, the moving image output from the imaging part as a live picture; a focus position adjusting part for changing the focus position of the shooting optical system in accordance with an operation performed by a user; a display control part for deciding an enlargement ratio of the live picture to be displayed by the display part; and an in-focus evaluation value calculating part for calculating, for each frame of the live view display, an in-focus evaluation value indicating the in-focus level of a predetermined portion of the frame of the moving image output from the imaging part, wherein the display control part decides the enlargement ratio of the subject in the live picture based on the in-focus evaluation value.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 8B is a diagram showing an example of indicating the in-focus evaluation value in each lens position shown in FIG. 8A;

FIG. 8C is a diagram showing an example of indicating the in-focus evaluation value in the process of move (3) shown in FIG. 8A;

DETAILED DESCRIPTION OF THE PREFERRED EMBODIMENT

Preferred embodiments of the invention are described below with reference to the accompanying drawings.

First Embodiment

Figure 1:
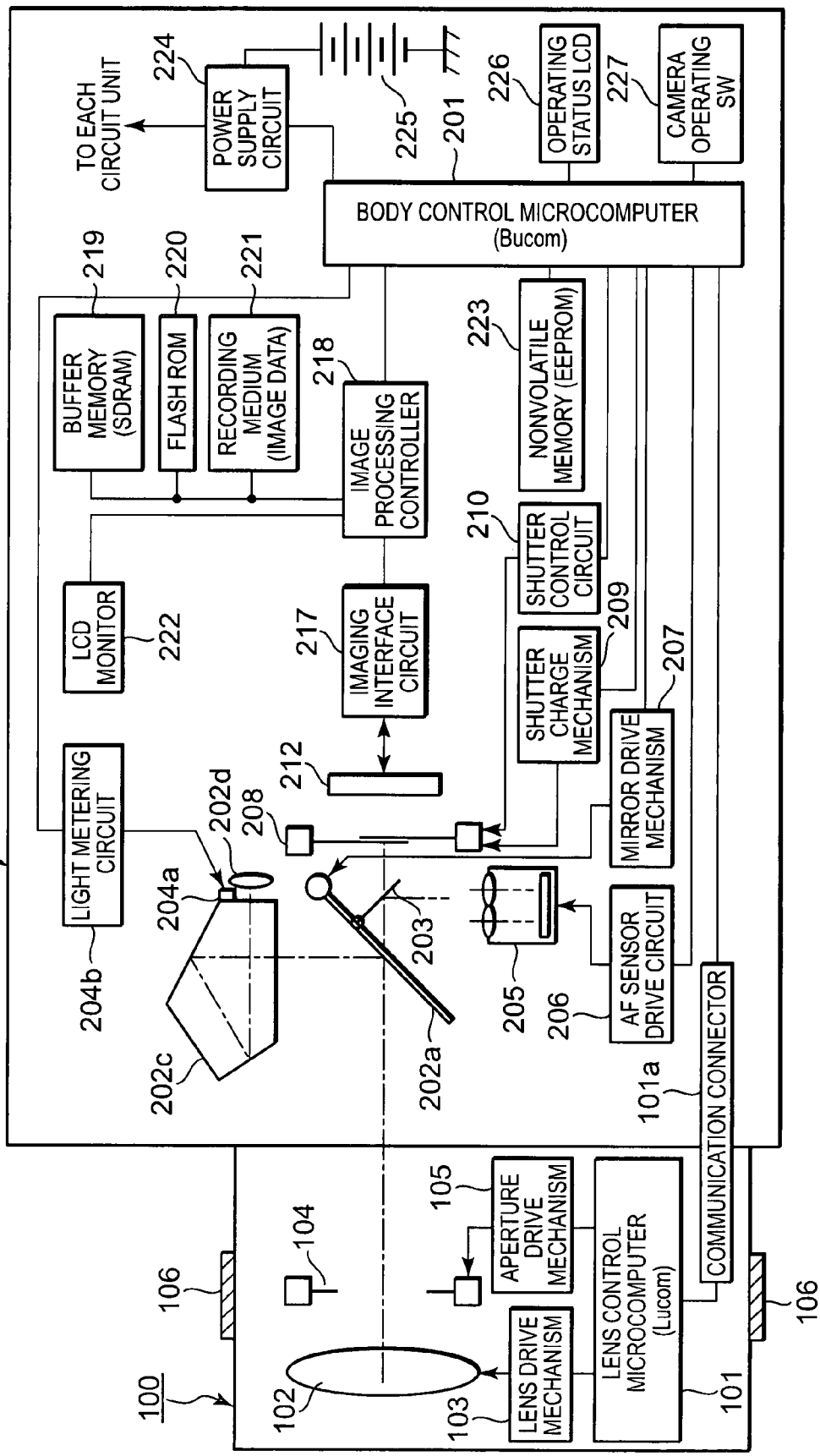
FIG. 1 is a block diagram showing a detailed structure of a camera in which an imaging apparatus according to a first embodiment of the present invention is mounted.

FIG. 1 is a block diagram showing a detailed structure of a camera in which an in-focus state display device according to the embodiment is mounted. Referring to FIG. 1, components of the camera will be described in detail by taking, as an example, an AF mode performed in an ordinary camera.

First, as shown in FIG. 1, the camera in which the in-focus state display device according to the embodiment is mounted consists principally of a lens barrel 100 and a camera body 200.

Here, each component of the lens barrel 100 is controlled by a lens control microcomputer (hereinafter referred to as "Lucom") 101. On the other hand, each component of the camera body 200 is controlled by a body control microcomputer (hereinafter referred to as "Bucom") 201. Here, when the lens barrel 100 is mounted on the camera body 200, the Lucom 101 and the Bucom 201 are communicably connected through a communication connector 101a. In this case, the Lucom 101 cooperates dependently with the Bucom 201 to operate as a camera system.

A shooting optical system 102 is arranged inside the lens barrel 100. Here, a single optical lens is shown in FIG. 1 as representing a plurality of optical lenses constructing the shooting optical system 102. This shooting optical system 102 includes a focus lens for adjusting the in-focus position of a subject image. The focus lens is moved in an optical axis direction by means of a DC motor (not shown) in a lens drive mechanism 103.

An aperture 104 is provided behind the shooting optical system 102. This aperture 104 is driven to open/close by means of a stepping motor (not shown) in an aperture drive mechanism 105. The opening/closing of the aperture 104 is controlled to control the light amount of a light beam incident from a subject into the camera body 200 through the shooting optical system 102.

Here, the DC motor in the lens drive mechanism 103 and the stepping motor in the aperture drive mechanism 105 are controlled by the Lucom 101 in accordance with instructions from the Bucom 201. Further, when a focus ring 106 as a rotatable member provided around the lens barrel 100 is rotated by a user, the focus lens in the shooting optical system 102 is moved in the optical axis direction by means of the lens drive mechanism 103 in synchronism with the rotation of the focus ring 106. In other words, the focus ring 106 is an operating member for allowing the user to adjust focus manually.

On the other hand, a finder device having a main mirror 202a, a pentaprism 202c, and an eyepiece lens 202d is provided inside the camera body 200. In a normal state of the camera, part of a light beam incident from the subject through the shooting optical system 102 is reflected by the main mirror 202a. As a result, an image to be viewed is formed through the pentaprism 202c and the eyepiece lens 202d.

Here, a photosensor 204a is provided in the vicinity of the pentaprism 202c so that part of the light beam passing through the pentaprism 202c enters the photosensor 204a. Then, a light metering circuit 204b performs known light metering processing based on the light amount of the light beam detected by the photosensor 204a. The light metering value processed and obtained in the light metering circuit 204b is sent to the Bucom 201.

The Bucom 201 computes the amount of exposure for shooting based on the light metering value input from the light metering circuit 204b. This amount of exposure is sent from the Bucom 201 to the Lucom 101. The Lucom 101 controls the driving of the aperture 104 based on the amount of exposure notified from the Bucom 201.

On the other hand, the light beam passing through the main mirror 202a and reflected by a sub-mirror 203 is guided to an AF sensor unit 205 for performing automatic focusing processing (AF processing). An area sensor (not shown) is provided inside the AF sensor unit 205, and the light beam incident on this area sensor is converted to an electric signal.

The output from this area sensor is sent to the Bucom 201 through an AF sensor drive circuit 206. Then, the Bucom 201 performs distance measurement processing to compute a focusing state (defocus amount), of the shooting optical system 102 necessary for focusing. Then, this defocus amount is sent from the Bucom 201 to the Lucom 101. The Lucom 101 calculates the moving amount of the shooting optical system 102 based on the defocus amount notified from the Bucom 201. The lens drive mechanism 103 moves the focus lens in the shooting optical system 102 according to the moving amount output from the Lucom 101.

In the meantime, when the camera is in a shooting operation state, the main mirror 202a is moved to a predetermined up position retracted from the optical axis of the shooting optical system 102. The main mirror 202a is driven by a mirror drive mechanism 207. Further, the mirror drive mechanism 207 is controlled by the Bucom 201. Here, when the main mirror 202a is moved to the up position, the sub-mirror 203 is folded along with the movement of the main mirror 202a.

Thus, by moving the main mirror 202a to the up position, the light beam from the subject that passed through the shooting optical system 102 enters a shutter part 208. The light beam passing through the shutter part 208 then enters an image pickup device 212 arranged behind the shutter part 208. The shutter part 208 is a focal-plane shutter composed of a front curtain and a rear curtain. Here, a spring force for driving the front curtain and the rear curtain is charged by a shutter charge mechanism 209. Further, the front curtain and the rear curtain are driven by a shutter control circuit 210. The shutter charge mechanism 209 and the shutter control circuit 210 are controlled by the Bucom 201.

Then, a subject light image on the image pickup device 212 is converted to an electric signal (picture signal). The electric signal is read and digitized by an imaging interface circuit 217 every predetermined timing. Then, image data digitized by the imaging interface circuit 217 is stored in a buffer memory 219 such as an SDRAM through an image processing controller 218. Here, the buffer memory 219 is a memory for temporary storage of data such as image data, and is used as a working area for image data when subjected to various processing.

After that, the image data read by the imaging interface circuit 217 and stored in the buffer memory 219 is read by the image processing controller 218. The image data read by the image processing controller 218 is subjected to known image processing, such as white balance correction, gradation tone correction, and color correction, and the processed image data is stored in the buffer memory 219. Then, upon image recording, the image data processed by the image processing controller 218 is compressed by a known compression technique such as JPEG. The JPEG data obtained by this JPEG compression is stored in the buffer memory 219, and recorded in a flash ROM 220 or a recording medium 221 as a JPEG file with predetermined header information added thereto.

Here, the flash ROM 220 is assumed to be a memory incorporated in the camera, and the recording medium 221 is assumed to be a recording medium capable of being externally attached to the camera. For example, a memory card or a hard disk drive removable from the camera is used as the recording medium 221.

On the other hand, upon playback of an image from a JPEG file stored in the flash ROM 220 or the recording medium 221, JPEG data stored in the flash ROM 220 or the recording medium 221 is read and decompressed by the image processing controller 218. After that, this decompressed image data is trimmed and/or resized to fit a predetermined display size, and a video image signal is generated from the trimmed and/or resized image data and then output to the LCD monitor 222. The resized image is displayed as a thumbnail still image on the LCD monitor 222.

A nonvolatile memory 223 storing predetermined control parameters necessary for camera control is also connected to the Bucom 201 in such a manner to be accessible therefrom. This nonvolatile memory 223 is, for example, a rewritable EEPROM. Further, a battery 225 as a power source is connected to the Bucom 201 through a power supply circuit 224. The power supply circuit 224 converts electric power from the battery 225 into a voltage necessary for each component of the camera system, and supplies the voltage to each component of the camera system.

In addition, an operating status LCD 226 for showing the operating status of the camera to inform the user of it, and camera operating SWs (camera operating switches) 227 for detecting operating states of various operating members of the camera are connected to the Bucom 201.

Upon providing an electronic viewfinder (EVF) display in the camera concerned, the imaging interface circuit 217 repeats reading of a picture signal from the image pickup device 212 and conversion thereof to digital image data every predetermined timing. The digital image data is subjected to image processing performed by the image processing controller 218 such as white balance correction for EVF display, and converted to a moving image. Each frame of the moving image is trimmed and/or resized to fit a predetermined display size. A video image signal is generated from the trimmed and/or resized moving image and output to the LCD monitor 222 as a live view image. The user can view the live image displayed on this LCD monitor 222 to check an image to be shot.

When the operating control of the above-mentioned EVF display is performed, a display typically called a live view display can be provided. To provide a live view display, the following operating control is typically performed. First, the main mirror 202a is moved to the up position, and the shutter part 208 is opened. As a result, the shooting light beam directly enters the image pickup device 212. After that, the image pickup device 212 performs imaging at a predetermined frame rate (indicative of the number of shot images per second), and the image processing controller 218 processes image data read by the imaging interface circuit 217 displays the processed image data on the LCD monitor 222. This allows the user to see the live view display on this LCD monitor 222 in order to check a subject image without looking through the eyepiece lens.

Figure 2:
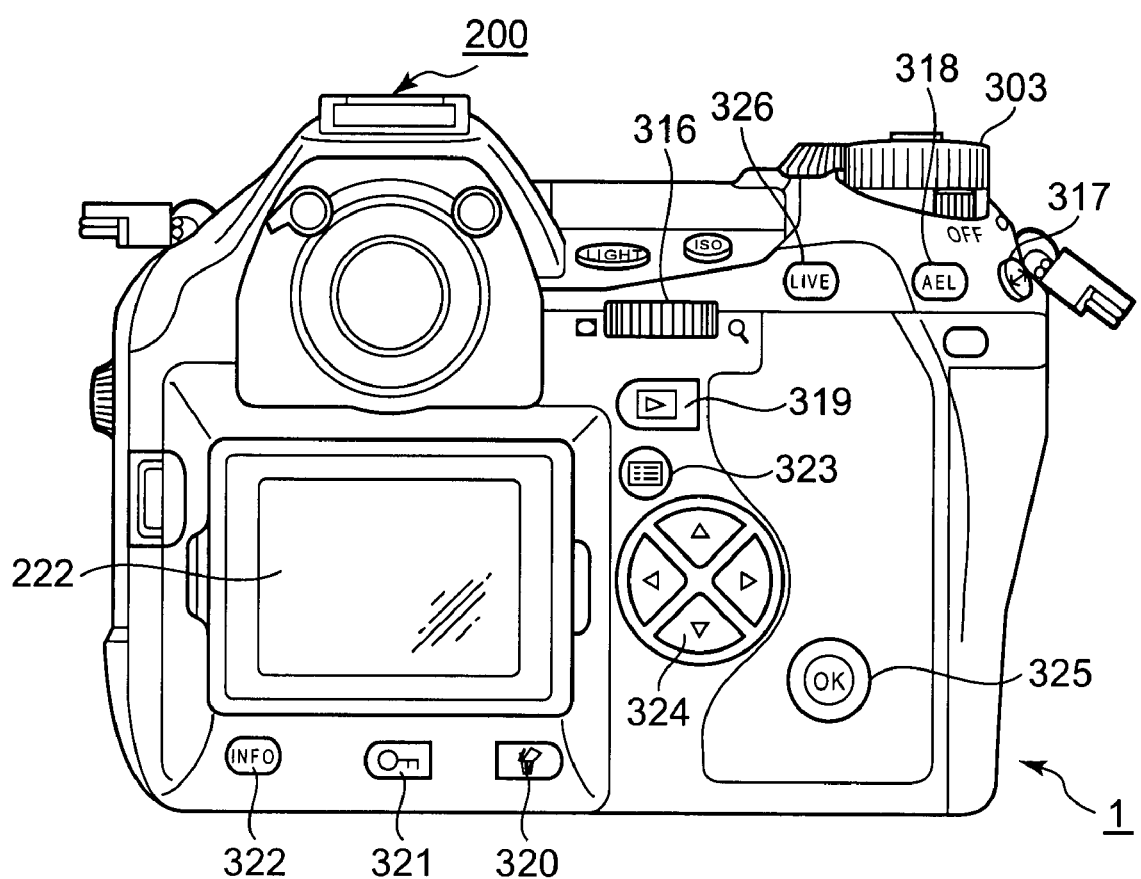
FIG. 2 is a back view of the camera in which the imaging apparatus according to the first embodiment of the present invention is mounted.

Referring next to FIG. 2 showing a back view of the camera in which the in-focus state display device according to the embodiment is mounted, various operating members used by the user on the camera will be described.

As shown, on the back face of the camera 1 concerned, a main dial 316, an AF frame button 317, an AE lock button 318, a playback mode button 319, an erase button 320, a protect button 321, an information display button 322, a menu button 323, an arrow pad 324, an OK button 325, and a live button 326 are provided. Then, on the top face of the camera 1, a mode dial 303 is provided. The following describes the respective members in due order.

First, the main dial 316 is a member to be rotated to change the setting of a function related to the operating member currently operated by the user.

The mode dial 303 is a member for setting any one of various shooting modes. Here, it is assumed that the mode dial 303 is set in a scene mode (SCN) as an example of the various shooting modes. If the user rotates the main dial 316 on condition that the mode dial 303 is set in SCN, a menu screen related to shooting condition settings for desired scenes is displayed on the LCD monitor 222. Here, the desired scenes include, for example, a portrait scene, a sport scene, a self-timer scene, a landscape scene, a night scene, etc. Then, according to the scene selected by the user from these scenes, various shooting conditions such as exposure, flash firing, a light metering mode, an AF system, a sequential shooting interval, etc. are set for shooting.

The AF frame button 317 is a button for selecting an AF system upon shooting. If the main dial 316 is rotated while this AF frame button 317 is pressed, the AF system is changed, for example, to multi AF or spot AF.

In the multi-AF mode, focusing states at plural focusing points on the screen are detected, while in the spot-AF mode, a focusing state at a point (selectable from plural candidates) on the screen is detected.

The AE lock button 318 is a button for locking exposure conditions. In other words, while this AE lock button 318 is being pressed, the amount of exposure computed then is locked.

The playback mode button 319 is a button for switching the operation mode of the camera 1 to a playback mode capable of playback-displaying, on the LCD monitor 222, an image from a JPEG file stored in the flash ROM 220 or the recording medium 221.

The erase button 320 is a button for erasing image data (JPEG file) from the flash ROM 220 or the recording medium 221 during the playback mode.

The protect button 321 is a button for protecting image data from being erased by accident during the playback mode.

The information display button 322 is a button for displaying image information based on additional information of image data (e.g., Exif information) on the LCD monitor 222.

The menu button 323 is a button for displaying a menu screen on the LCD monitor 222. This menu screen consists of menu items in a multi-layered structure. The user can select a desired menu item using the arrow pad 324 and confirm the selected item by pressing the OK button 325. Here, the menu items include, for example, a shooting menu, a playback menu, a custom menu, a setup menu, etc. On the shooting menu, setup of the flash ROM 220 or the recording medium 221, setting of the image quality of image data, setting of image processing, setting of a scene mode, etc. can be selected. On the playback menu, playback conditions upon image playback and conditions upon image printing can be set. On the custom menu, various detailed settings are possible according to camera user's preferences. On the setup menu, the operating status of the camera such as an alarm beep sound is set.

The live button 326 is a button for selecting a mode for providing the above-mentioned live view display. This mode for providing the live view display is called a live view mode below. When the live button 326 is pressed by the user, the live view display is started on the LCD monitor 222 (i.e., the camera enters the live view mode). Then, when the live button 326 is pressed again, the live view mode is terminated. During the live view mode, since the main mirror 202a is at the up position, no light beam enters the AF sensor unit 205, i.e., in this case, the AF system is disabled. In other words, when the camera enters the live view mode, the Bucom 201 switches from the AF operating status to the MF operating status.

Note here that the content set by the user operating each of the operating members is stored, such as in the buffer memory 219 or a memory (not shown) in the Bucom 201.

Figure 3A:
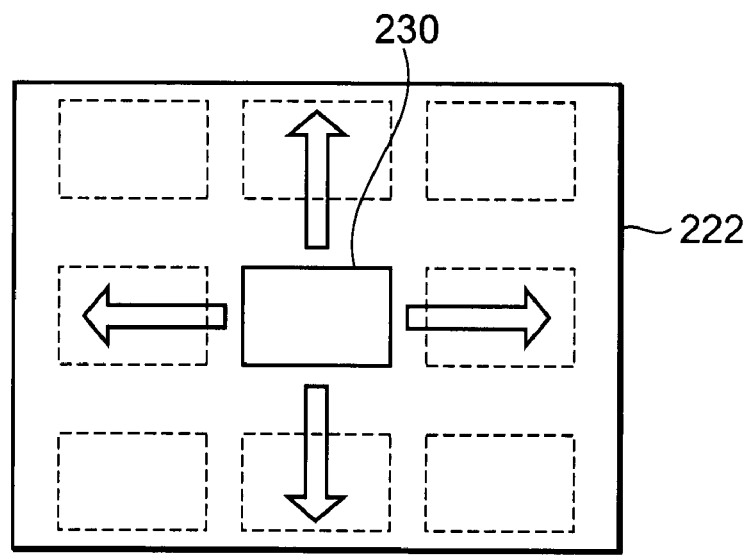
FIGS. 3A to 3C contain views showing display screens on a LCD monitor during a live view mode.
Figure 3B:
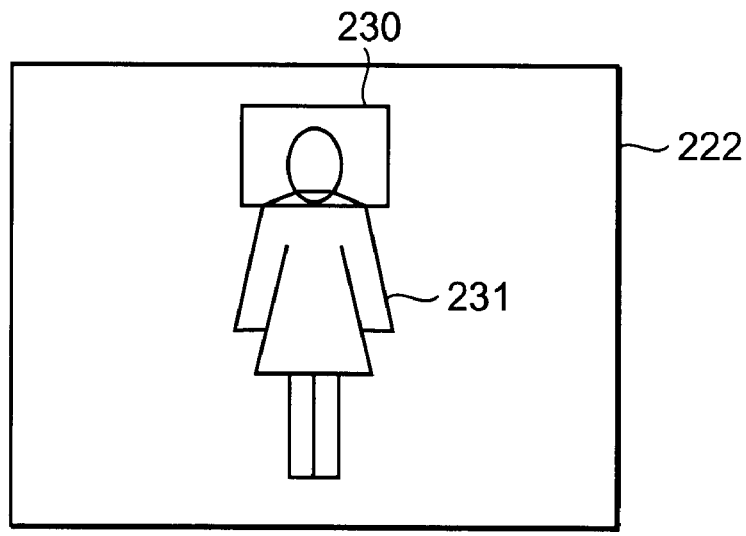
Figure 3C:
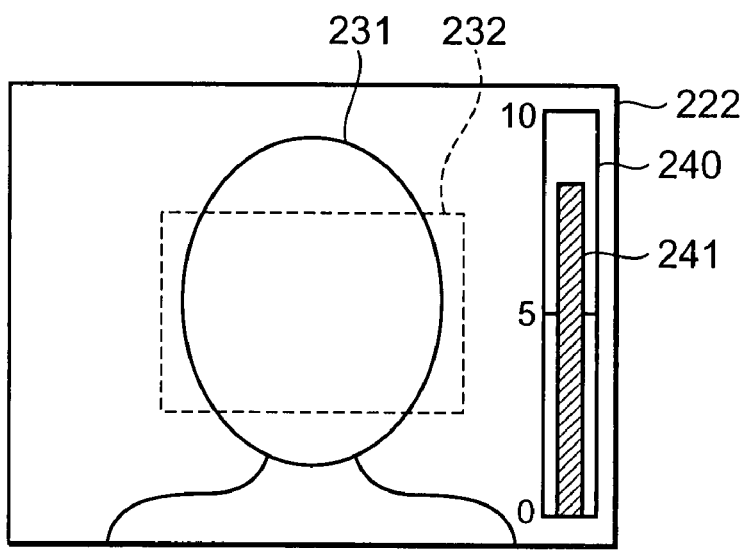

Referring next to FIGS. 3A to 3C, actual in-focus display stages of the in-focus state display device according to the embodiment will be described.

First, as mentioned above, if the user presses the live button 326, the camera enters the live view mode. At this time, the live view display of a subject on the LCD monitor 222 is started.

Further, when the camera enters the live view mode, a zoom-in box 230 for specifying a zoom-in area within a display screen of the LCD monitor 222 appears as shown in FIG. 3A (note that the description of the subject is omitted in FIG. 3A).

Here, the zoom-in box 230 shown in FIGS. 3A and 3B can move to any area desired by the user on the LCD monitor 222 as shown in FIG. 3A. Therefore, the user operates the arrow pad 324 to move the zoom-in box 230 to a desired area including an image portion the user wants to zoom in, and then presses the OK button 325 to enable, on the LCD monitor 222, a zoom-in display of the area enclosed with the zoom-in box 230 (see FIG. 3C).

Thus, in the live view mode, the user can enable a zoom-in display of any area. The purpose of providing a zoom-in display of any area is to make it easy for the user to perform focusing upon MF. According to the present invention, the enlargement ratio upon zoom-in display is decided according to the in-focus level of a predetermined area (the details will be described later). In other words, the higher the in-focus level of the predetermined area, the higher the enlargement ratio upon zoom-in display. The following describes an example of such a zoom-in display in chronological order. Note that the zoom-in display is performed electronically by the image processing controller 218.

For example, suppose that the main subject is a person as shown in FIGS. 3B and 3C. In this case, if an area including a head portion of the main subject 231 is to be zoomed in, the user operates the arrow pad 324 to put the zoom-in box 230 on the area including the head portion of the main subject 231. After that, when the user presses the OK button 325, the head area of the main subject 231 is zoomed in and displayed on the LCD monitor 222 as shown in FIG. 3C (i.e., it enters the zoom-in mode). The mode for enabling a zoom-in display as shown in FIG. 3C is referred to as "zoom-in mode" below. Thus, a zoom-in display of an image (see FIG. 3B) in the area of the zoom-in box 230 positioned by the user is provided using the entire display screen of the LCD monitor 222 as shown in FIG. 3C.

Here, in the zoom-in mode, the image (the head image of the main subject 231 in this example) in the area of the zoom-in box 230 is zoomed in and displayed on the LCD monitor 222. Then, an area corresponding to 50 percent of the screen height from the center in up/down, left/right directions on the LCD monitor 222 is treated as an in-focus evaluation value computing area 232, and an in-focus evaluation value in the in-focus evaluation value computing area 232 is computed at a predetermined frame rate.

Then, the in-focus evaluation value computed in the in-focus evaluation value computing area 232 is indicated as an indicator bar 241 in an in-focus meter 240 provided, for example, on the right side of the display screen of the LCD monitor 222 as shown in FIG. 3C. Here, the longer the length of the indicator bar 241, the higher the in-focus evaluation value (i.e., the higher the in-focus level), while the shorter the length of the indicator bar 241, the lower the in-focus evaluation value (i.e., the lower the in-focus level). In this example, although the indicator bar 241 indicating the in-focus evaluation value is displayed only in the zoom-in mode, the in-focus meter 240 and the indicator bar 241 can, of course, be displayed in the non-zoom in mode shown in FIG. 3B in the same manner.

Computation for representing the in-focus evaluation value as the indicator bar 241 in the in-focus meter 240, and computation for determining, based on the in-focus evaluation value, the enlargement ratio for zoom-in display on the LCD monitor 222 will be described later.

Figure 4A:
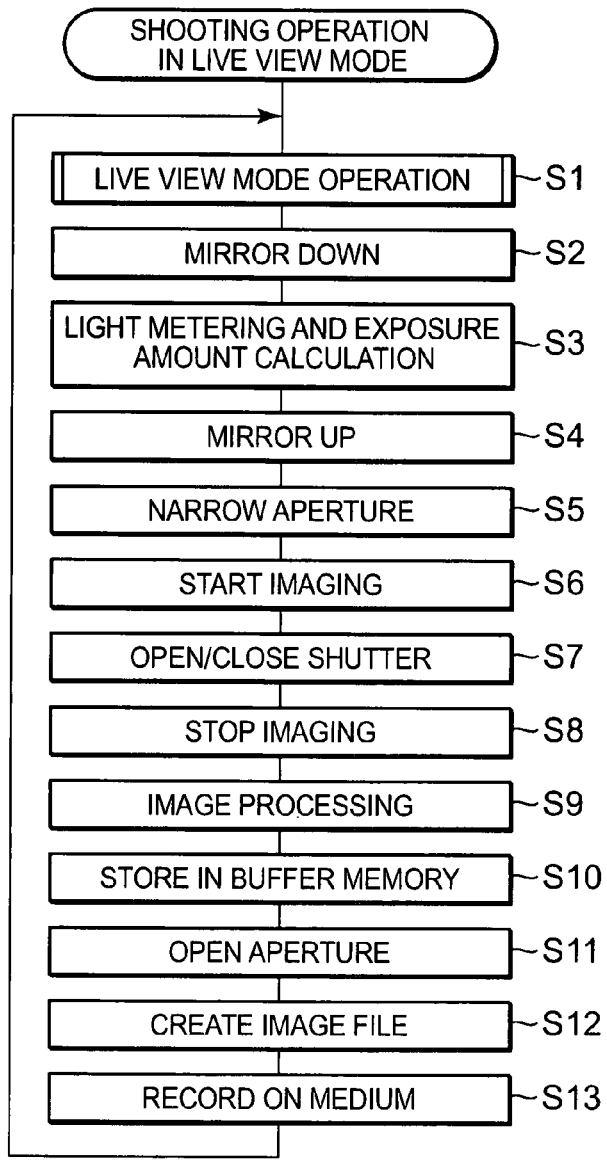
FIG. 4A is a flowchart showing a flow of operating control performed by a Bucom for a shooting operation in the live view mode of the camera in which the imaging apparatus according to the first embodiment of the present invention is mounted.

Referring next to a flowchart shown in FIG. 4A, a flow of operating control performed by the Bucom 201 for the shooting operation in the live view mode will be described. Since the detailed operating control of the components of the camera is described above with reference to FIG. 1, the following describes mainly the flow of processing.

Note that a release switch (not shown) in the camera is of a typical two-step switch structure. In other words, a first release switch is turned on when the user presses the release button halfway, while a second release switch is turned on when the user fully presses the release button. Note further that the shooting operation is started when the second release switch is turned on.

First, when an operation to switch to the above-mentioned live view mode is performed (i.e., when the user presses the live button 326), the camera enters the live view mode. At this time, the sequence of operations mentioned above with reference to FIGS. 3A to 3C are performed by the user. After the preprocessing in the live view mode is performed, the camera shifts to shooting processing in the live view mode as shown in FIG. 4A.

Figure 6:
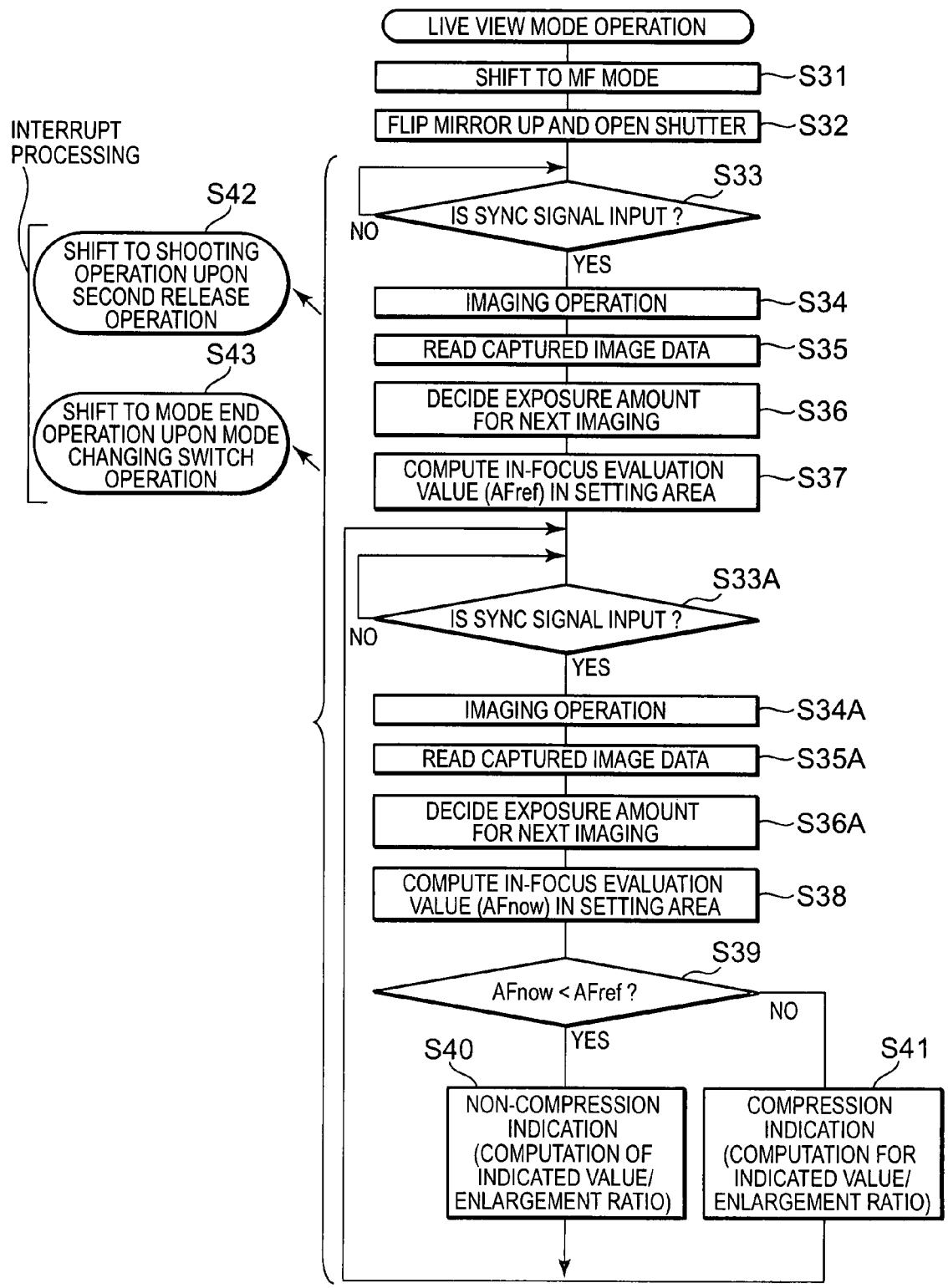
FIG. 6 is a flowchart showing operating control performed by the Bucom to indicate the in-focus evaluation value in the live view mode.

First, when the camera shifts to the live view mode, a live view display of a subject is started on the LCD monitor 222, and the live view mode operation in step S1 is continued until a release operation or a mode switching operation is performed (step S1). This operation in step S1 will be described in detail later with reference to another flowchart (FIG. 6). During the live view mode operation in step S1, if the release button (not shown) is fully pressed by the user, the second release switch is turned on, and the live view mode operation in the step S1 is terminated. Then, the main mirror 202a is driven through the mirror drive mechanism 207 from the up position to a down position (initial position) as the home position of the main mirror 202a shown in FIG. 1 (step S2). Step S2 is a step for performing light metering.

Next, light metering is performed by the photosensor 204a and the light metering circuit 204b to compute the open time of the shutter part 208 and the aperture value of the aperture 104 (step S3). Then, the main mirror 202a is driven to the up position by means of the mirror drive mechanism 207 (step S4). Further, the aperture 104 is driven based on the aperture value calculated in step S3 (step S5).

After that, the driving of the image pickup device 212 is started to start an imaging operation (step S6). Further, the shutter part 208 is opened based on the open time calculated in step S3, and after the open time has elapsed, the shutter part 208 is closed again (step S7). After the shutter part 208 is closed, the driving of the image pickup device 212 is stopped, and the imaging interface circuit 217 reads a picture signal from the image pickup device 212 and converts it to digital image data (step S8). Then, the image processing controller 218 performs image processing on pixel data output in step S8 from the imaging interface circuit 217 (step S9).

Then, image data processed in step S9 is temporarily stored in the buffer memory 219 (step S10). Further, the aperture 104 is returned to the maximum aperture position (step S11).

After that, an image file containing the image data is created (step S12). In this step S12, the image file containing the image data is created in such a manner to write the image data, temporarily stored in the buffer memory 219 in step S10, to the recording medium 221. Then, the image file containing the image data created in step S12 is recorded on the recording medium 221 (step S13). After that, the procedure returns to step S1 to resume the live view.

Figure 4B:
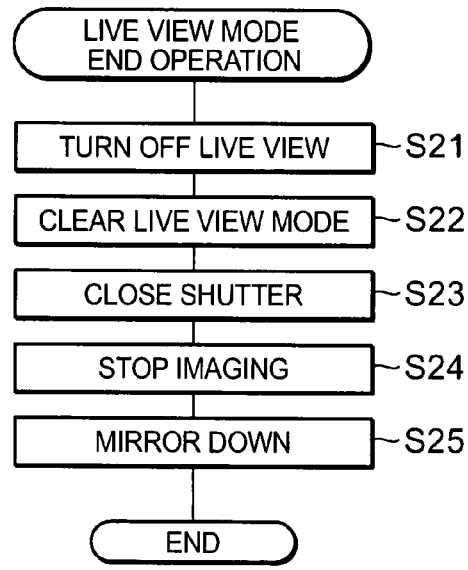
FIG. 4B is a flowchart showing a flow of processing performed by the Bucom upon ending a live view mode operation.

Referring next to a flowchart of FIG. 4B showing a flow of processing performed by the Bucom 201 upon ending the live view mode operation, a live view mode end operation will be described. Note that, if the user presses the live button 326 during the live view mode operation in step S1, the procedure shifts to the flowchart shown in FIG. 4B.

First, the live view display on the LCD monitor 222 is terminated (step S21). Then, the MF operating state of the camera set during the live view mode is cleared, and the camera is reset to an AF operating state before the live view mode is set (step S22).

Then, the shutter part 208 that is open is closed (step S23). Further, the driving of the image pickup device 212 is stopped along with closing of the shutter part 208 (step S24). Then, the main mirror 202a is driven to the down position as its initial position (step S25). After that, the camera enters a standby state.

Figure 5A:
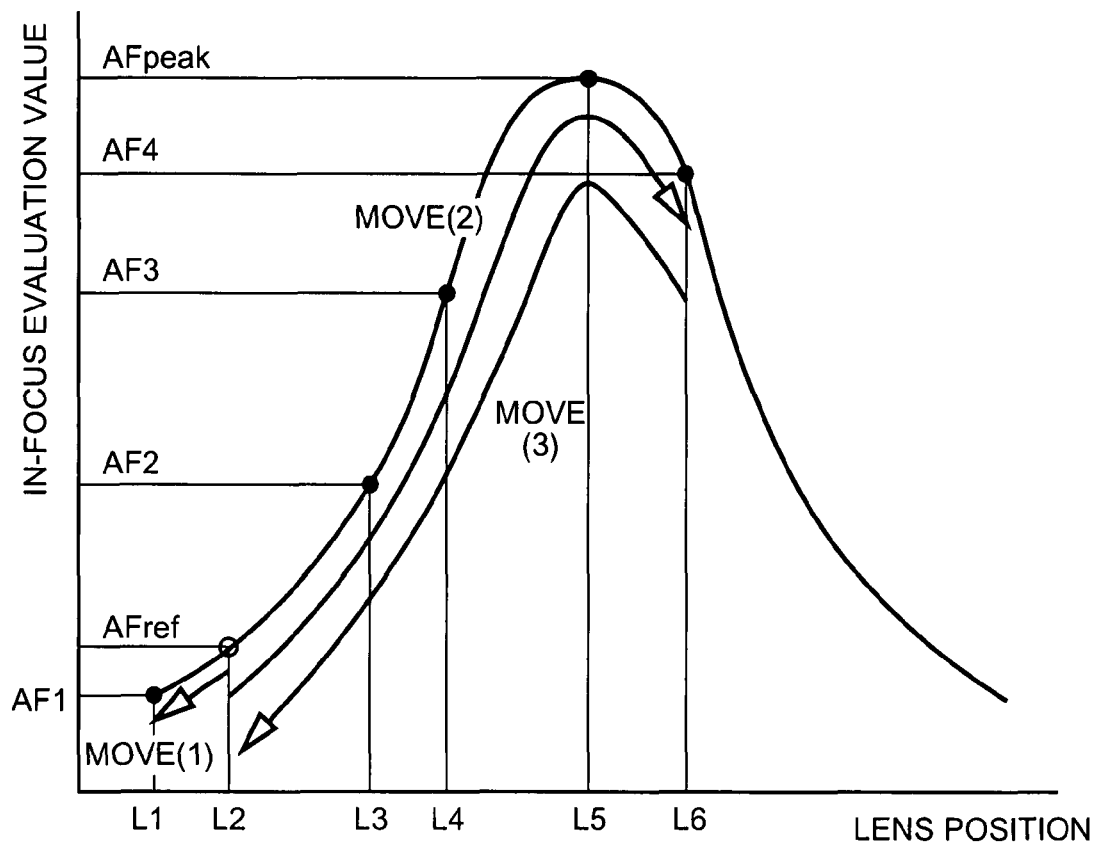
FIG. 5A is a graph showing the relationship between in-focus evaluation value and lens position of a shooting optical system according to the first embodiment of the present invention.
Figure 5B:
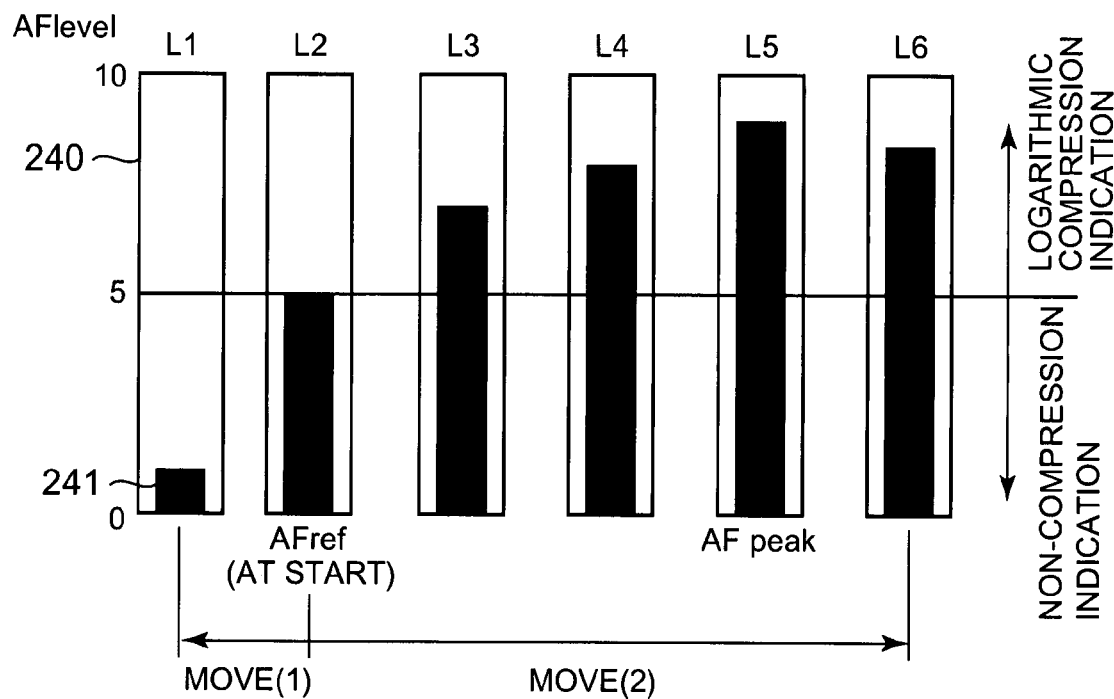
FIG. 5B is a diagram showing an example of indicating the in-focus evaluation value in each lens position shown in FIG. 5A.
Figure 5C:
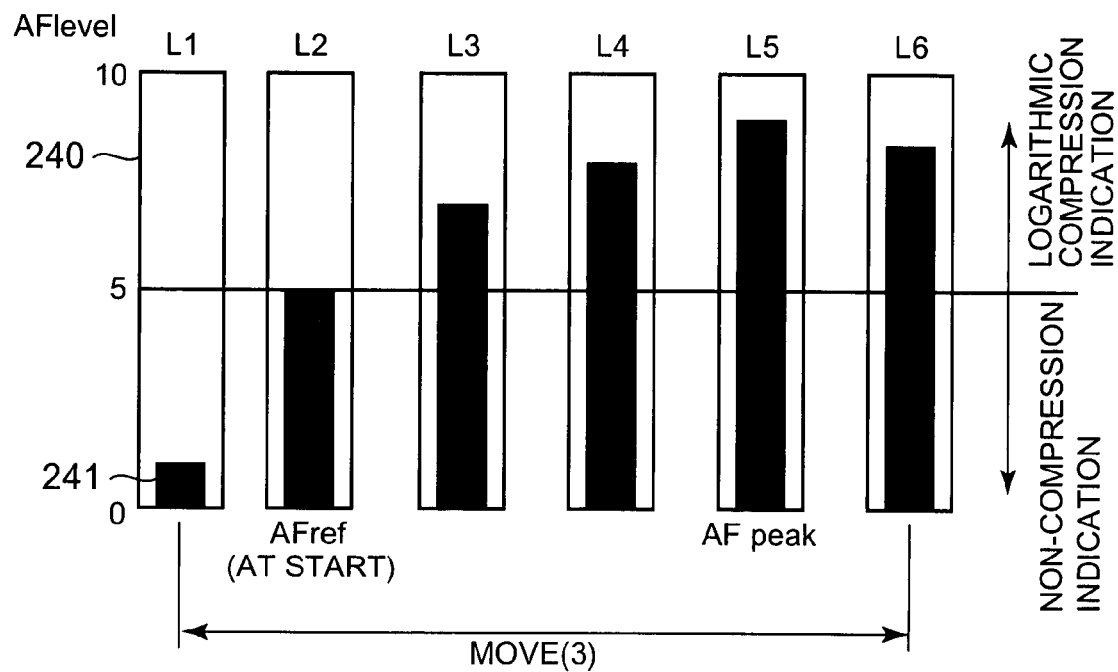
FIG. 5C is a diagram showing an example of indicating the in-focus evaluation value in the process of move (3) shown in FIG. 5A.
Figure 5D:
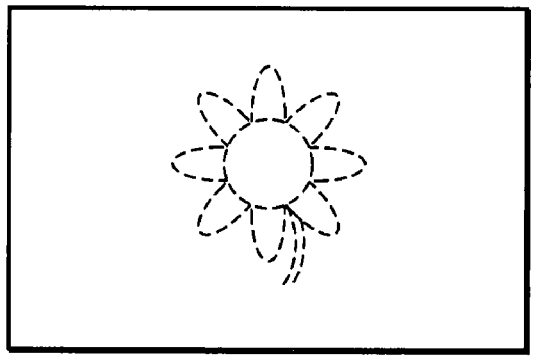
FIG. 5D contains views each showing an example of display on the LCD monitor corresponding to each lens position shown in FIG. 5A.
Figure 5D:
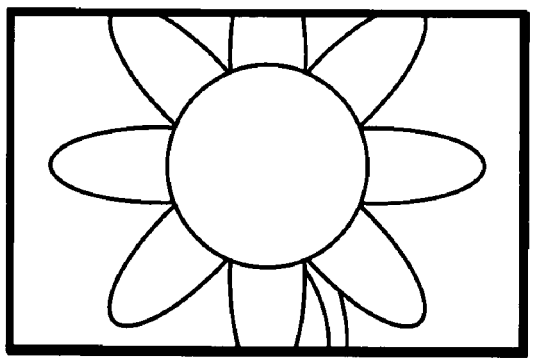
Figure 5D:
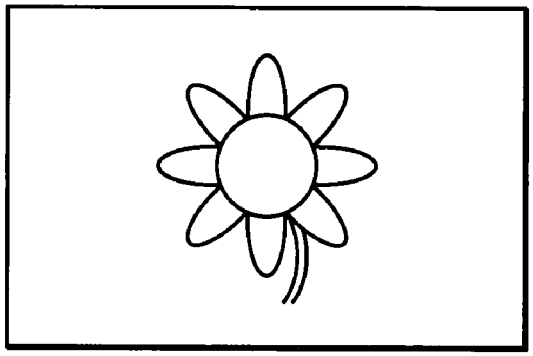
Figure 5D:
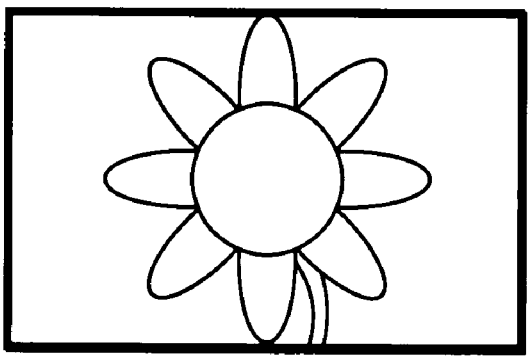
Figure 5D:
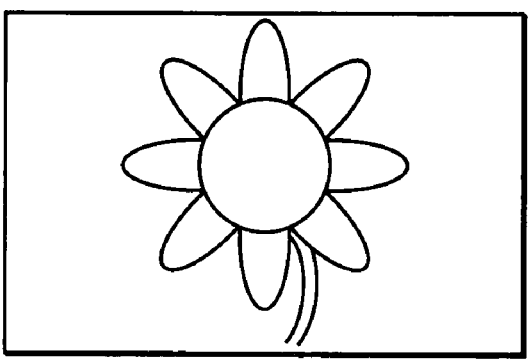

Referring next to FIGS. 5A to 5D, a display image on the LCD monitor 222 for manual focus and a display example of an indicator (indicator bar 241) as part of features of the in-focus state display device according to the first embodiment will be described. Here, FIG. 5A is a graph showing a relationship between the in-focus evaluation value and the lens position of the focus lens (focus lens position) in the shooting optical system 102 according to the first embodiment. FIG. 5B is a diagram showing an example of indicating the in-focus evaluation value in each lens position shown in FIG. 5A. FIG. 5C is a diagram showing an example of indicating the in-focus evaluation value in the process of move (3) shown in FIG. 5A. FIG. 5D contains views each showing an example of image display on the LCD monitor 222 corresponding to each lens position shown in FIG. 5A.

Note that, as shown in FIG. 5A, an in-focus evaluation value at the time of switching to the zoom-in mode is set as $AF_{ref}$ indicating a reference in-focus evaluation value. Then, a focus lens position of the shooting optical system 102 at this time is set as position L2. In this example, it is assumed that the in-focus evaluation value $AF_{ref}$ is significantly low (i.e., the image is significantly out of focus) at position L2. Note further that the Bucom 201 repeatedly computes the in-focus evaluation value at a predetermined frame rate after switching to the zoom-in mode. Here, when the focus lens position of the shooting optical system 102 is at position L2, the zoom-in display of a subject image displayed on the LCD monitor 222 is, for example, as shown in FIG. 5D (2).

Further, the enlargement ratio upon this zoom-in display is set to a predetermined value depending on the in-focus evaluation value (the details will be described later). When the focus lens position of the shooting optical system 102 is at position L2, since the in-focus evaluation value is, of course, lower than the in-focus evaluation value in the in-focus state, the enlargement ratio at this time is set smaller than the enlargement ratio in the in-focus state.

Further, a bar having a length corresponding to the in-focus evaluation value at each time point is displayed within the in-focus meter 240 as the indicator bar 241. The indicated value of the bar indicator corresponding to the in-focus evaluation value and a calculation method for the enlargement ratio upon zoom-in display will be described later. Thus, in FIGS. 5A to 5C, the in-focus evaluation value is treated as a numerically coarse value.

First of all, upon moving the focus lens position of the shooting optical system 102 from position L2 in response to a rotation operation of the focus ring 106, the user does not know in which direction to rotate the focus ring 106 in order to bring the focus lens close to the in-focus state.

Therefore, the user once rotates the focus ring 106 in either direction to move the lens position of the shooting optical system 102. For example, if the focus lens position of the shooting optical system 102 comes to position L1 shown in FIG. 5A as a result of the user's operation of the focus ring 106, the in-focus evaluation value is lowered as shown in FIG. 5A and hence the image becomes more out of focus (move (1)).

The zoom-in display of the subject image displayed on the LCD monitor 222 at this time becomes, for example, as shown in FIG. 5D (1). In other words, when the focus lens position of the shooting optical system 102 is at position L1, the enlargement ratio is set smaller than the case where the focus lens position of the shooting optical system 102 is at position L2. This is because, when the focus lens position of the shooting optical system 102 is at position L1, the in-focus evaluation value is lower than the case where the focus lens position of the shooting optical system 102 is at position L2.

Then, the indicator bar 241 corresponding to the in-focus evaluation value when the focus lens position of the shooting optical system 102 is at position L1 is indicated in the in-focus meter 240 (see FIG. 5B). Thus, when the in-focus evaluation value is lowered, the user has only to rotate the focus ring 106 in reverse direction.

Suppose here that the focus lens position of the shooting optical system 102 comes to position L5 through position L2, position L3, and position L4 as a result of the user's rotation of the focus ring 106 in the reverse direction, and the in-focus evaluation value at position L5 is a peak value (indicating the most in-focus state).

When the focus lens position of the shooting optical system 102 is at position L2, position L3, and position L5, the zoom-in displays of the subject image displayed on the LCD monitor 222 become as shown in FIG. 5D (2), FIG. 5D (3), and FIG. 5D (4), respectively. Namely, as the focus lens position of the shooting optical system 102 moves from position L1 to position L5, the subject image displayed on the LCD monitor 222 is electronically zoomed in.

In other words, the subject image is displayed on the LCD monitor 222 at a predetermined enlargement ratio corresponding to an in-focus evaluation value at each focus lens position of the shooting optical system 102. For example, when the focus lens position of the shooting optical system 102 is at position L3, since the in-focus evaluation value is larger than those at position L1 and position L2, the enlargement ratio is set larger. Further, when the focus lens position of the shooting optical system 102 is at position L5, since the in-focus evaluation value is larger than that at position L3, the enlargement ratio is set further larger.

Thus, as the focus lens position of the shooting optical system 102 moves from position L1 to position L5, since the subject image is brought close to the in-focus state, the indicator bar 241 indicated in the in-focus meter 240 corresponds to the in-focus evaluation value at each time point as shown in FIG. 5B. Note that, when the focus lens position of the shooting optical system 102 is at position L5, the in-focus evaluation value is a peak value. Therefore, it can be said that the subject image at this time is in the most in-focus state.

However, even if the focus lens position of the shooting optical system 102 comes to position L5 and hence the in-focus evaluation value becomes the peak value, the user does not know if the value at the time point is the peak value. Therefore, the user continues to rotate the focus ring 106 after the focus lens position of the shooting optical system 102 reaches position L5 (move (2)).

Then, for example, when the focus lens position of the shooting optical system 102 comes to position L6, the subject image displayed on the LCD monitor 222 becomes slightly more out of focus than that at position L5. In other words, the zoom-in display of the subject image displayed when the focus lens position of the shooting optical system 102 is at position L6 becomes, for example, as shown in FIG. 5D (5). In this case, the zoom-in display of the subject image is provided on the LCD monitor 222 at a predetermined enlargement ratio corresponding to the in-focus evaluation value when the focus lens position of the shooting optical system 102 is at position L6.

Specifically, when the focus lens position of the shooting optical system 102 is at position L6, the in-focus evaluation value is lower than that at position L5 and higher than those at position L1 and position L2. Therefore, the enlargement ratio when the focus lens position of the shooting optical system 102 is at position L6 is set larger than that at position L2 and smaller than that at position L5.

In other words, as the focus lens position of the shooting optical system 102 changes from position L5 to position L6, the subject image displayed on the LCD monitor 222 becomes out of focus, and along therewith, the value set as the enlargement ratio becomes smaller.

Further, as the focus lens position of the shooting optical system 102 changes from position L5 to position L6, the indicator bar 241 corresponding to the in-focus evaluation value at each time point is indicated in the in-focus meter 240. In other words, as shown in FIG. 5C, as the focus lens position of the shooting optical system 102 changes from position L5 to position L6, the length of the indicator bar 241 in the in-focus meter 240 becomes short.

Since the user who checks such a change in the indicator bar 241 recognizes that the focus lens has already passed the in-focus position, the user rotates the focus ring 106 in reverse direction (move (3)), that is, the user returns the focus lens position of the shooting optical system 102 to position L5 at some midpoint in move (3).

In other words, in the imaging apparatus according to the first embodiment, the zoom-in display of the subject image is performed at a predetermined enlargement ratio corresponding to the in-focus evaluation value. To be more specific, the larger the in-focus evaluation value, the larger the enlargement ratio upon zoom-in display becomes.

The following describes a calculation method for the value of the indicator bar 241.

In this example, as apparent from FIGS. 5A to 5C, the in-focus evaluation value when the focus lens is at position L2 is set as a reference in-focus evaluation value $AF_{ref}$. This is because, as mentioned above, the in-focus evaluation value at the time point upon shifting to the zoom-in mode is set as a reference value for the in-focus evaluation value.

Then, in the process of moving the focus lens of the shooting optical system 102 from position L2 to position L1 (move (1)), the in-focus evaluation value decreases.

At this time, the Bucom 201 computes, for example, the following equation (1) to calculate a value ($AF_{level}$) to be indicated as the indicator bar 241 in the in-focus meter 240:

For $AF_{now} < AF_{ref}$, $$\text{Display value } AF_{Level} = \{10 \times (AF_{now}/AF_{ref})\} - 5 \quad (1)$$

In this equation, $AF_{now}$ denotes the latest in-focus evaluation value upon computation. Further, if $AF_{level} < 0$ in the computation of the equation (1), $AF_{level} = 0$ is set. Note that, as apparent from FIG. 5B, the $AF_{level}$ value becomes small as the focus lens position of the shooting optical system 102 changes from position L2 to position L1.

Here, as apparent from equation (1), when $AF_{now} < AF_{ref}$, the value to be indicated as the indicator bar 241 in the in-focus meter 240 is calculated by multiplying the ratio between $AF_{now}$ and $AF_{ref}$ ten times. Therefore, if the user rotates the focus ring 106 in a direction opposite to the direction in which the focus lens approaches the in-focus state, since the indication of the indicator bar 241 becomes short rapidly as shown in FIG. 5B, the user can easily recognize that the rotation operation is not to approach the in-focus position.

On the other hand, in the process of moving the focus lens of the shooting optical system 102 from position L2 to position L6 (move (2)), the in-focus evaluation value increases in this process. At this time, the Bucom 201 computes, for example, the following equation (2) to calculate a value to be indicated as the indicator bar 241 in the in-focus meter 240:

For $AF_{now} \geq AF_{ref}$, $$\text{Display value } AF_{level} = \log_2(AF_{now}/AF_{ref}) + 5 \quad (2)$$

It is apparent from the equation (2) that when the focus lens position of the shooting optical system 102 is at position L2, since $AF_{level} = 5$, the indicator bar 241 indicates a value around a central portion (a line indicating an AF level of 5) in the in-focus meter 240. After that, the AF level value increases as the focus lens is moved from position L2, and after it passes through position L5 as its lens position where the in-focus level becomes the highest, the $AF_{level}$ value decreases inversely.

Here, the reason for standardizing $AF_{now}$ with $AF_{ref}$ to display as a feature of the embodiment will be described.

The absolute value of the in-focus evaluation value largely varies, by its nature, depending on the contrast and brightness of the subject, the effect of camera shake, etc. Therefore, if the in-focus evaluation value is indicated on a linear scale, the indicator bar 241 more or less fluctuates with changes in the position of the subject or the shooting conditions. In these cases, although the peak value of the in-focus evaluation value can be detected, the usability for users who has limited knowledge on the in-focus evaluation value is not good. In other words, it is difficult to say that the in-focus meter 240 plays a sufficient role in making manual focus easy.

Therefore, in the embodiment, the in-focus evaluation value is displayed after being transformed to a value normalized with respect to the predetermined value. It is considered that the evaluation value $AF_{ref}$ at a lens position where the focus lens is largely out of focus is ideal as a base of normalization. This is because, if the peak value of the in-focus evaluation value (the in-focus evaluation value at position L5) is set as $AF_{peak}$, the range of $AF_{peak} - AF_{ref}$ values becomes large. Therefore, even if the absolute value of the in-focus evaluation value largely fluctuates with changes in the position of the subject or the shooting conditions, since the in-focus evaluation value is normalized with reference to $AF_{ref}$ in the embodiment, the range of $AF_{peak} - AF_{ref}$ values can be large enough to fall within a predetermined range. In other words, the display range (5 to 10 in this example) can be optimized in the in-focus meter 240.

Thus, in the embodiment, when $Af_{now} \geq AF_{ref}$, compression computation is performed using a logarithmic compression as shown in equation (2). On the other hand, when $AF_{now} < AF_{ref}$, the compression computation is not performed and the non-compression computation as shown in equation (1) is performed.

The following describes the reason for performing a compression computation using the logarithmic compression in equation (2).

The absolute value of the in-focus evaluation value varies depending on the computation method. For example, there is a case that the ratio between $AF_{now}$ and $AF_{ref}$ could be several ten times. Therefore, the indication range of the in-focus meter 240 cannot be set properly when the in-focus evaluation value is indicated on a linear scale. In view of this, the logarithmic compression as shown in equation (2) is performed in the embodiment. This makes it possible to indicate the $AF_{level}$ in a range of 5 to 10. Since the $AF_{level}$ can be displayed in the range of 5 to 10, this display device can support a range up to a point where the ratio of $AF_{peak}$ to $AF_{ref}$ becomes 32 times (32 is fifth power of two).

If the ratio of $AF_{peak}$ to $AF_{ref}$ is smaller depending on the computation method for the in-focus evaluation value, the logarithmic compression may not be necessary, and of course, the compression method does not need to use logarithm.

The following describes a method of setting the above-mentioned enlargement ratio.

An enlargement ratio K for zoom-in display of the subject image displayed on the LCD monitor 222 is set, for example, as follows:

$$\text{Enlargement Ratio } K = k1 \times AF_{now} \qquad (3)$$

where k1 denotes a predetermined coefficient and $AF_{now}$ denotes an in-focus evaluation value. Further, the maximum value and the minimum value of the enlargement ratio K are set, for example, to 10 and 1 times, respectively.

Since the enlargement ratio K is thus set, the enlargement ratio K for zoom-in display of the subject image displayed on the LCD monitor 222 can be set to a value proportional to the in-focus evaluation value.

In addition to the above-mentioned setting method for the enlargement ratio K, the following setting methods can be considered.

[First Setting Method]

In this first setting method, the enlargement ratio K is set as follows:

$$\text{Enlargement Ratio } K = m1 \times AF_{level} \qquad (4)$$

where m1 denotes a predetermined coefficient and $AF_{level}$ denotes an indicated value of the indicator bar 241. Further, the maximum value and the minimum value of the enlargement ratio K are set, for example, to 10 and 1 times, respectively.

According to equation (4), the enlargement ratio K can be set to a value proportional to the indicated value of the indicator bar 241. In other words, according to the first setting method, changes in the indication of the indicator bar 241 can be associated with changes in the enlargement ratio K for zoom-in display of the subject image displayed on the LCD monitor 222.

[Second Setting Method]

This second setting method is based on the first setting method, where the coefficient value multiplied by the indicated value $AF_{level}$ of the indicator bar 241 is changed according to the indicated value $AF_{level}$ of the indicator bar 241. Specifically, in the second setting method, the enlargement ratio K is set as follows:

(i) For $AF_{level} < B$, $$\text{Enlargement Ratio } K = m1 \times AF_{level} \qquad (5)$$

(ii) For $AF_{level} \geq B$, $$\text{Enlargement Ratio } K = m2 \times (AF_{level} - B) + m1 \cdot B \qquad (6)$$

where m1>m2.

In other words, according to the second setting method, when the indicated value $AF_{level}$ of the indicator bar 241 is smaller than a predetermined value B, i.e., when the subject image is out of focus (where the in-focus evaluation value is small), the coefficient multiplied by the indicated value $AF_{level}$ of the indicator bar 241 is changed to m1 larger than m2. This enables a greater change in the enlargement ratio K in response to a change in the indicated value $AF_{level}$ of the indicator bar 241.

In other words, if the subject image is significantly out of focus, since the change in the focusing state of the image displayed on the LCD monitor 222 as a result of the rotation of the focus ring 106 is too small (to recognize visually), the enlargement ratio K is changed greatly to make it easy for the user to visually recognize the change in focusing state.

On the other hand, when the indicated value of $AF_{level}$ of the indicator bar 241 is larger than the predetermined value B, i.e., when the in-focus evaluation value is large, the coefficient multiplied by the indicated value $AF_{level}$ of the indicator bar 241 is changed to m2 smaller than m1. This enables a smaller change in the enlargement ratio K in response to a change in the indicated value $AF_{level}$ of the indicator bar 241.

In other words, if the in-focus evaluation value is large, the change in the focusing state of the image displayed on the LCD monitor 222 in response to the rotation of the focus ring 106 is made small, thereby making easy MF operation while viewing changes in focusing state.

As described above, the second setting method is very effective in achieving MF operation while viewing changes in the focusing state of the zoom-in display of the subject image displayed on the LCD monitor 222.

[Third Setting Method]

The third setting method is based on the first setting method like the second setting method, where the coefficient value multiplied by indicated value $AF_{level}$ of the indicator bar 241 is changed according to the indicated value $AF_{level}$ of the indicator bar 241. Specifically, in the third setting method, the enlargement ratio K is set as follows:

(i) For $AF_{level} < B$, $$\text{Enlargement Ratio } K = m3 \times AF_{level} \qquad (7)$$

(ii) For $AF_{level} \geq B$, $$\text{Enlargement Ratio } K = m4 \times (AF_{level} - B) + k3 \cdot B \qquad (8)$$

where m4>m3.

In other words, according to the third setting method, when the indicated value $AF_{level}$ of the indicator bar 241 is larger than the predetermined value B, i.e., when the subject image is close to being in focus, the coefficient multiplied by the indicated value $AF_{level}$ of the indicator bar 241 is changed to m4 larger than m3 to enable a greater change in the enlargement ratio K. Thus, the change in the size of the zoom-in display of the subject image displayed on the LCD monitor 222 in response to the rotation of the focus ring 106 is made greater, and this makes it easy to visually recognize that the in-focus evaluation value reaches the peak value (i.e., that the subject image is in the in-focus state).

As described above, the third setting method is very effective in achieving MF operation in which emphasis is placed on the change in the size of the subject image, rather than the change in the focusing state of the zoom-in display of the subject image displayed on the LCD monitor 222.

[Fourth Setting Method]

The fourth setting method is such that, upon setting the enlargement ratio K by any one of the first setting method to the third setting method, the setting method for the enlargement ratio K is changed after the in-focus evaluation value passes the peak value (after it reaches the peak).

In other words, when fine MF focus adjustment toward the in-focus state is performed after the in-focus evaluation value passes through the peak, the change in the enlargement ratio K with the change in the in-focus evaluation value is made greater, and this makes it easy for the user to visually recognize the in-focus state and hence to finely adjust focus.

Specifically, in the fourth setting method, the enlargement ratio K is set as follows:

After the in-focus evaluation value passes the peak, $$\text{Enlargement Ratio } K = K_{max} - m5 \times AF_{level} \qquad (9)$$

where m5>m1 to m4. Further, $K_{max}$ represents the maximum value of the enlargement ratio, which is set, for example, to 10 times.

Thus, according to the fourth setting method, after the in-focus evaluation value passes the peak, the enlargement ratio K is set on the basis of $K_{max}$ as the maximum value of the enlargement ratio K and by employing a coefficient m5 larger than the coefficients m1 to m4 multiplied before the in-focus evaluation value passes the peak. This enables a greater change in the enlargement ratio K with the change in the in-focus evaluation value after the in-focus evaluation value passes the peak. In other words, according to the fourth setting method, the operationality upon performing fine MF focus adjustment toward the in-focus state after the in-focus evaluation value passes the peak can be improved.

Although [First Setting Method] to [Fourth Setting Method] are described as Setting methods for the enlargement ratio K, the setting methods for the enlargement ratio K are not limited thereto. For example, in consideration of both the rotation operation of the focus ring 106 and the visual effects of the zoom-in display of the subject image displayed on the LCD monitor 222, the enlargement ratio K can, of course, be set using any other function capable of improving the user's operational feeling such as a high-order function as a function of the in-focus evaluation value or the indicated value $AF_{level}$ of the indicator bar 241.

Referring next to a flowchart shown in FIG. 6, operating control performed by the Bucom 201 to actually indicate the in-focus evaluation value as shown in FIGS. 5A to 5C in the live view mode will be described. The flowchart shown in FIG. 6 is a flowchart showing the details of the processing in step S1 in the flowchart shown in FIG. 4A. Note that the same processing steps are given similar step numbers to omit redundant description.

The AF mode is disabled in the live view mode. Therefore, even if the AF mode is selected by an AF mode selecting switch (not shown) for switching to the AF mode, the AF mode is forcibly switched to the MF mode (step S31). In other words, switching to the MF mode is performed in step S31 to enable the live view mode.

Then, the main mirror 202a is moved to the up position, and the shutter part 208 is opened (step S32). As a result, the light beam enters the image pickup device 212 through the opening. After that, the procedure waits for the input of a sync signal (step S33). Here, the sync signal is a signal for driving the image pickup device 212 at predetermined intervals to output a picture signal. For example, if the frame rate is 30 frames per second, 30 picture signals are acquired per second. In other words, in this case, the sync signal is input from the imaging interface circuit 217 every 33.33 ms.

After that, when it is determined that the sync signal is input, electric charge accumulation of the image pickup device 212 is performed by the imaging interface circuit 217 (step S34). Then, upon completion of the electric charge accumulation of the image pickup device 212, a picture signal is read and converted to digital image data (captured image data) by means of the imaging interface circuit 217 (step S35). After that, this captured image data is computed in a known manner to compute an AE evaluation value for evaluating the amount of exposure, and based on the computation result, the amount of exposure for the next time of driving the image pickup device 212 is computed (step S36). Here, since the image pickup device 212 has a known electronic shutter function, the time for electric charge accumulation is set in step S36 according to the computed amount of exposure.

Then, the in-focus evaluation value in a setting area (where the setting area corresponds to the in-focus evaluation value computing area 232 shown in FIG. 3C, same below) is computed, and the computed value is set as $AF_{ref}$ as a reference in-focus evaluation value used later (step S37).

The in-focus evaluation value is obtained by performing high-pass filter processing on the output of the image pickup device 212 to extract a high frequency component and performing a known computation on the extracted high frequency component. As the known computation, there are known various conventional computation equations. Further, since the high frequency component becomes more intense as the subject image is focused, this in-focus evaluation value takes on large values.

After completion of processing in step S37, the procedure waits for the input of the next sync signal (step S33A). Here, if the sync signal is detected, the same processing steps S34A to S36A as the above-mentioned processing steps S34 to S36 are executed.

Then, after completion of the processing in step S36A, the in-focus evaluation value in the setting area is computed, and the obtained value is set as the in-focus evaluation value $AF_{now}$ (step S38). Then, the order of magnitude of the $AF_{ref}$ value and the $AF_{now}$ value is judged (step S39). In other words, it is determined in step S39 whether $AF_{now} < AF_{ref}$ or not. When the determination in step S39 turns to YES, $AF_{level}$ as not only the indicated value of the indicator bar 241, but also as a value required for setting the enlargement ratio K for zoom-in display on the LCD monitor 222 is determined according to the above-mentioned equation (1). In other words, a non-compression computation using $AF_{now}/AF_{ref}$ is executed (step S40). Then, the procedure waits for the next sync signal.

On the other hand, when the determination in step S39 turns to NO, since $AF_{now} \geq AF_{ref}$, $AF_{level}$ as not only the indicated value of the indicator bar 241, but also as a value required for setting the enlargement ratio K for zoom-in display on the LCD monitor 222 is determined according to the above-mentioned equation (2). In other words, a compression computation for compressing $AF_{now}/AF_{ref}$ by a logarithmic computation is executed (step S41).

Note that the image display on the LCD monitor 222 and the indication of the indicator bar 241 are updated from time to time according to the indicated value $AF_{level}$ and the value of the enlargement ratio K calculated as mentioned above.

Then, the procedure waits for the next sync signal (step S33A).

The following describes interrupt processing steps.

During processing in steps S33 to S41, the live view display is updated at a predetermined frame rate. During this period, when the user closes the second release switch, the Bucom 201 performs interrupt processing, and the procedure exits from the sequence in the flowchart and shifts to the processing in step S2 described with reference to FIG. 4A (step S42).

On the other hand, if the user presses the live button 326 when the live view display is being updated, the Bucom 201 performs interrupt processing, and the procedure exits from the sequence in the flowchart and shifts to the processing in step S21 described with reference to FIG. 4B (step S43).

As described above, according to the first embodiment, there can be provided an imaging apparatus having excellent operationality upon performing manual focus and capable of making manual focusing easy.

In other words, according the imaging apparatus of the first embodiment, the enlargement ratio K for the zoom-in display of the subject image on the LCD monitor 222 is changed according to the in-focus evaluation value, thereby improving MF operationality. Specifically, the enlargement ratio K is increased as the in-focus evaluation value increases, and this makes it easy to visually grasp changes in focusing state, resulting in significant improvement of MF operationality.

Further, according to the imaging apparatus of the first embodiment, the user can use both the indication of the indicator bar 241 indicating the in-focus evaluation value and the zoom-in display of the subject image displayed on the LCD monitor 222, resulting in further improvement of MF operationality.

In other words, the user of the imaging apparatus according to the first embodiment can recognize the focusing state of the subject image displayed on the LCD monitor 222, the display size of the subject image, and the in-focus level indicated as the change in the indicator bar 241. Thus, according to the first embodiment, there can be provided an imaging apparatus having significantly improved MF operationality compared to conventional imaging apparatuses.

[Modification]

The following describes a modification of the first embodiment.

It is an object of the modification to simplify an operation for resetting the $AF_{ref}$ value once set. According to the modification, the burden of resetting the $AF_{ref}$ value (operations for exiting the zoom-in mode once and entering the zoom-in mode again) as a result of changing the subject and the like can be eliminated.

Figure 7:
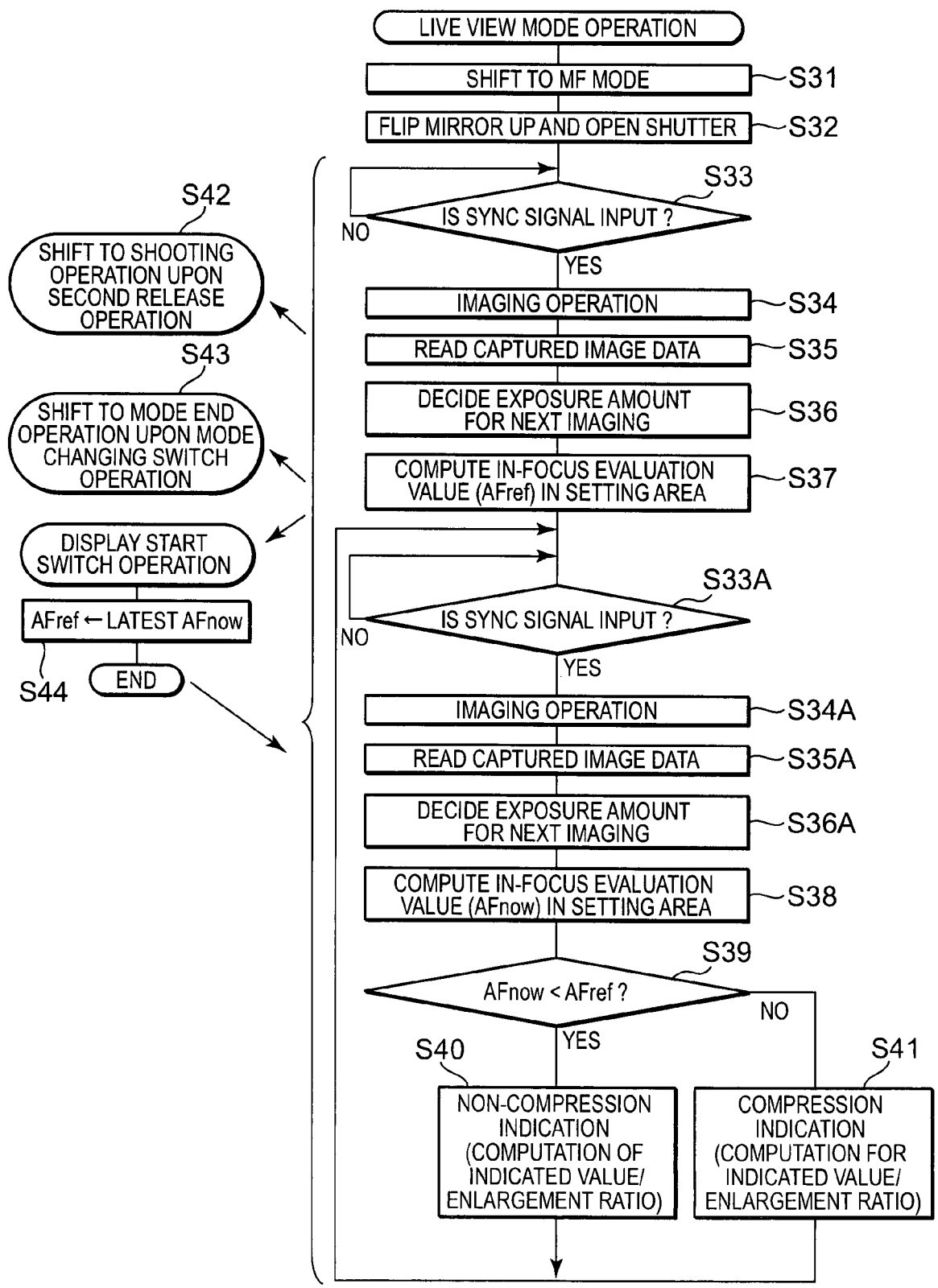
FIG. 7 is a flowchart showing a modification of the flowchart shown in FIG. 6.

A flowchart shown in FIG. 7 is a flowchart in which part of the flowchart shown in FIG. 6 is altered. Therefore, the same processing steps in the flowchart of FIG. 7 as those in the flowchart of FIG. 6 are given the same step number to omit redundant description. The following describes step S44 as a feature of the modification.

First, when a display start switch (not shown) is pressed by the user, the Bucom 201 performs interrupt processing, and the procedure shifts to processing in step S44. Here, in step S44, the in-focus evaluation value is calculated in the above-mentioned manner from an image shot at the time when the display start switch is pressed by the user, and the calculated value is reset as $AF_{ref}$. After that, the procedure returns to the processing step executed before the interrupt processing in step S44.

As described above, according to the modification, an in-focus state display device having the following effects in addition to those of the in-focus state display device according to the first embodiment can be provided. Namely, according to the modification, a new $AF_{ref}$ value can be set with easy operations as mentioned above. Since the newly set $AF_{ref}$ value is used for processing in later step S39, the indication of the in-focus meter 240 and the zoom-in display on the LCD monitor 222 are totally updated. In other words, according to the modification, there can be provided an in-focus state display device capable of, upon changing the subject, determining the indicated value of the indicator bar 241 in the in-focus meter 240 and the enlargement ratio for the zoom-in display on the LCD monitor 222 from the initial settings.

Note that a dedicated switch can be provided as the display start switch, or a switch for another usage can also be used as the display start switch.

Second Embodiment

Referring to the drawings, an in-focus state display device according to a second embodiment of the present invention will be described.

Figure 8A:
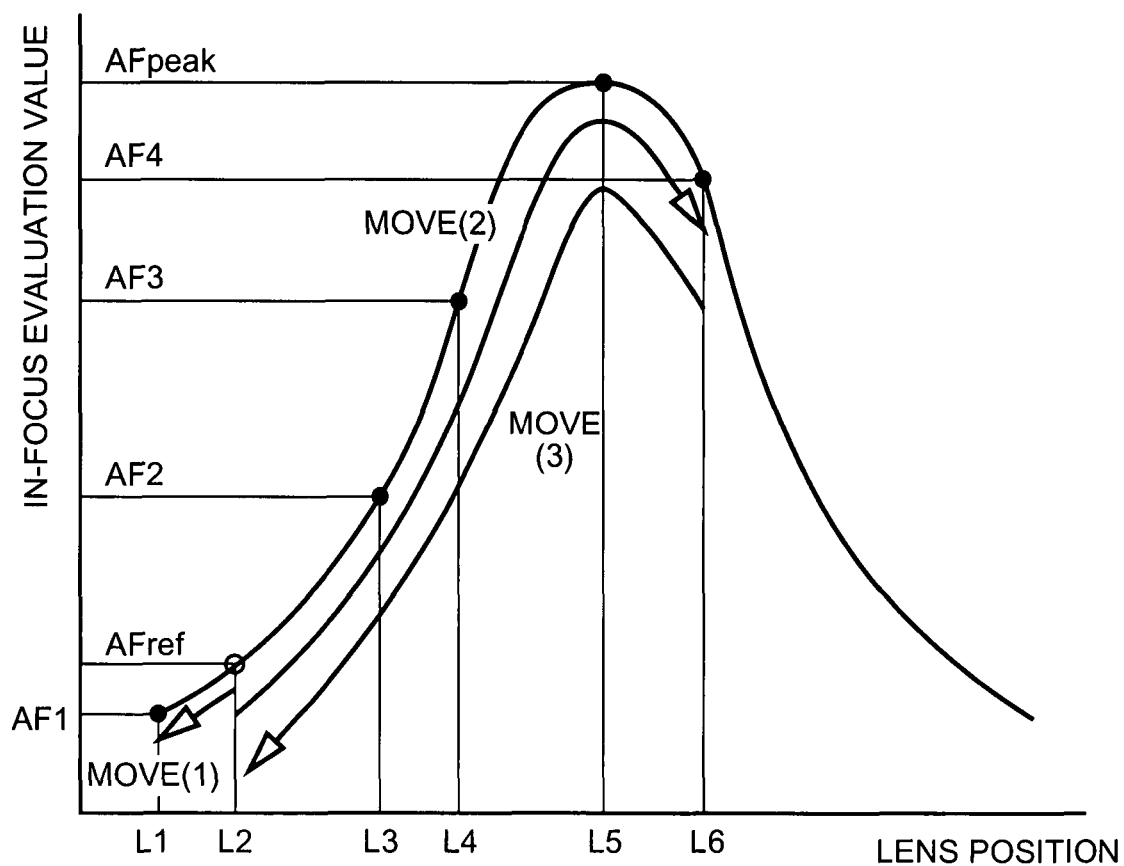
FIG. 8A is a graph showing the relationship between in-focus evaluation value and lens position of the shooting optical system according to a second embodiment of the present invention.
Figure 8D:
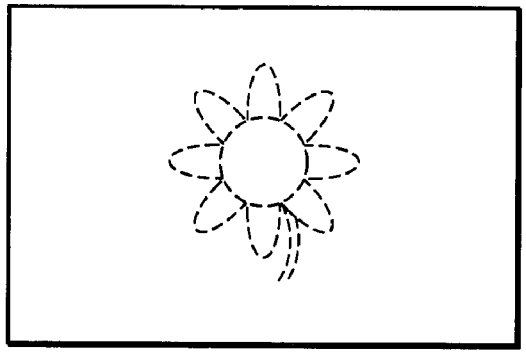
FIG. 8D contains views each showing an example of display on the LCD monitor corresponding to each lens position shown in FIG. 8A.
Figure 8D:
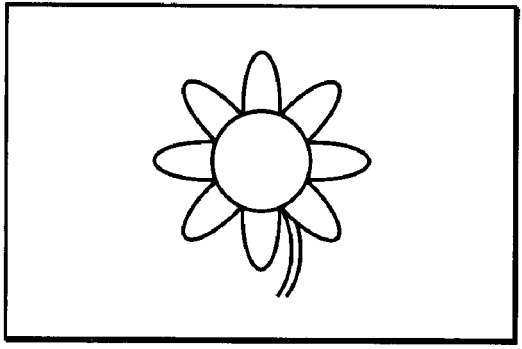
Figure 8D:
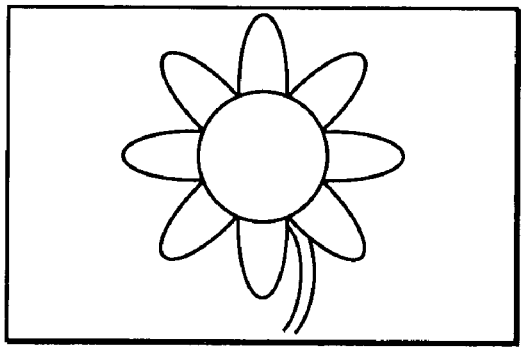
Figure 8D:
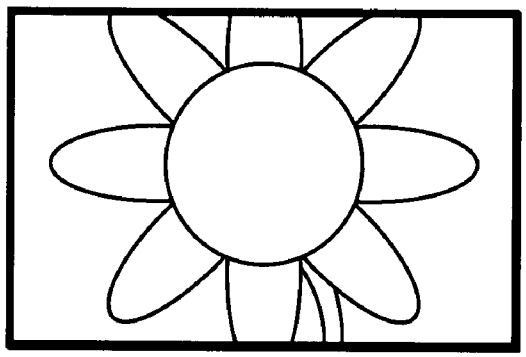
Figure 8D:
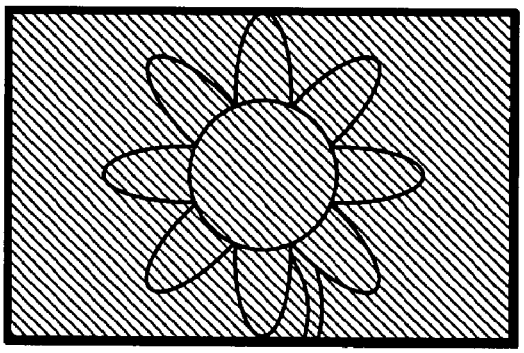

FIGS. 8A to 8C show an example of indication of the in-focus evaluation value as an indicator for manual focus as part of features of the in-focus state display device according to the embodiment. Here, FIG. 8A is a graph showing a relationship between the in-focus evaluation value and the focus lens position of the shooting optical system 102 according to the embodiment. FIG. 8B is a diagram showing an example of indicating the in-focus evaluation value in each focus lens position shown in FIG. 8A. FIG. 8C is a diagram showing an example of indicating the in-focus evaluation value in the process of move (3) shown in FIG. 8A. FIG. 8D contains views each showing an example of image display on the LCD monitor 222 corresponding to each lens position shown in FIG. 8A.

The following describes user's rotation operations of the focus ring 106, and the zoom-in display of the subject image on the LCD monitor 222 and the indication of the indicator bar 241, which change according to the rotation operations.

Note that FIGS. 8A to 8D correspond to FIGS. 5A to 5D according to the above-mentioned first embodiment, respectively. Especially, in the embodiment, the exactly same displays are provided in the process of move (1) and move (2) as those in the cases of move (1) and move (2) shown in FIG. 5A according to the first embodiment. Therefore, the following description is made mainly about different points between the imaging apparatus according to the first embodiment and the imaging apparatus according to the second embodiment.

FIG. 8B shows a case where the focus lens position of the shooting optical system 102 is moved to position L6 in the process of move (2). As apparent from FIG. 8B, the in-focus evaluation value has passed its maximum value $AF_{peak}$ in the process of move (2). In such a case, according to the embodiment, if it is determined that the in-focus evaluation value has passed its maximum value $AF_{peak}$, the indication format of the in-focus evaluation value, i.e., the indication format of the indicator bar 241, and the display format of the zoom-in display of the subject image on the LCD monitor 222 are changed in order to make the user aware that the in-focus evaluation value has passed its maximum value $AF_{peak}$. The details of an algorithm (peak detection algorithm) for determining that the in-focus evaluation value has passed the peak will be described later with reference to FIG. 9.

In other words, according to the second embodiment, once the in-focus evaluation value has passed the peak, the peak detection algorithm determines that it has passed the peak, and the indication format of the indicator bar 241 is switched to another indication format as shown in FIG. 8C (in the example of FIG. 8, indication color is changed from black to red). Further, the display color for the zoom-in display of the subject image on the LCD monitor 222 is changed to another display color as shown in FIG. 8D (5). In the example of FIG. 8D (5), the image processing controller 218 changes the white balance to change the color balance of the live view display screen in such a manner to change the display image from natural color to grayish natural color.

In FIG. 8B, it is determined that the in-focus evaluation value has passed its peak when the focus lens has reached position L6, and the indication color is changed from black to red as shown in the indicator bar 241 at position L6 of FIG. 8C.

Thus, the change in indication color can be considered, for example, as a specific example of changing the indication format. In the example of FIG. 8C, if it is determined that the peak has been passed, the indication color of the indicator bar 241 is changed to red (on condition that the normal indication color of the indicator bar 241 is black). Further, the display color for the zoom-in display of the subject image on the LCD monitor 222 is changed as shown in FIG. 8D (5) (in the example of FIG. 8D, the display image color is changed from natural color to grayish natural color).

In addition to changing the indication and display colors, there are other ways to change the indication and display formats, such as to change the texture pattern of the indicator bar 241 (e.g., change to a striped texture pattern), change the display position of the indicator bar 241 on the LCD monitor 222, and change the outer frame of the display part of the LCD monitor 222. In other words, any change in indication/display format is possible as long as it can make the user aware of passing the in-focus position. Further, instead of changing the display color of the entire display part of the LCD monitor 222 as shown in FIG. 8D (5), part of the display part of the LCD monitor 222 can, of course, be changed.

Here, move (3) shown in FIG. 8A and FIG. 8C show the indication of the indicator bar 241 in the process of move (3) where the focus lens position of the shooting optical system 102 is returned to position L5 (the lens position of the optimum in-focus state) according to the reverse rotation of the focus ring 106 made by the user (the operation for rotating the focus ring in reverse direction opposite to the rotation direction of the focus ring upon peak detection). FIG. 8C shows a case where the focus lens position of the shooting optical system 102 has passed position L5 again and is returned to position L1.

The second embodiment also has the following features that are not included in the first embodiment. Namely, according to the second embodiment, the range of the indicator bar 241 and the behavior of enlargement ratio for zoom-in display on the LCD monitor 222 are changed before and after the peak detection. This makes it easy for the user to perform MF operation.

Specifically, as for the zoom-in display on the LCD monitor 222, the enlargement ratio is fixed once the peak detection algorithm determines that the in-focus evaluation value has passed its peak. For example, it is fixed to 10 times as the maximum value.

Further, as for changing the range of the indicator bar 241, the range of in-focus evaluation values ($AF_{peak} - AF_{ref}$) from the initial position to the in-focus position in the process up to move (2) is known. Therefore, the indication of the indicator bar 241 that is a logarithmic compression indication before it is determined that the in-focus evaluation value has passed its peak is switched to a non-compression indication based on the following equation (10) after it is determined that the in-focus evaluation value has passed its peak so that the indication near $AF_{peak}$ can be scaled up:

After peak detection, $$\text{Indicated Value } AF_{level} = 10 \times (AF_{now}/AF_{peak}) - 2 \quad (10)$$

If $AF_{now} = AF_{peak}$, $AF_{level} = 8$. Thus, the in-focus evaluation value can be indicated in the indicator bar 241 in a linear-scale range of 1 to 10.

Figure 9A:
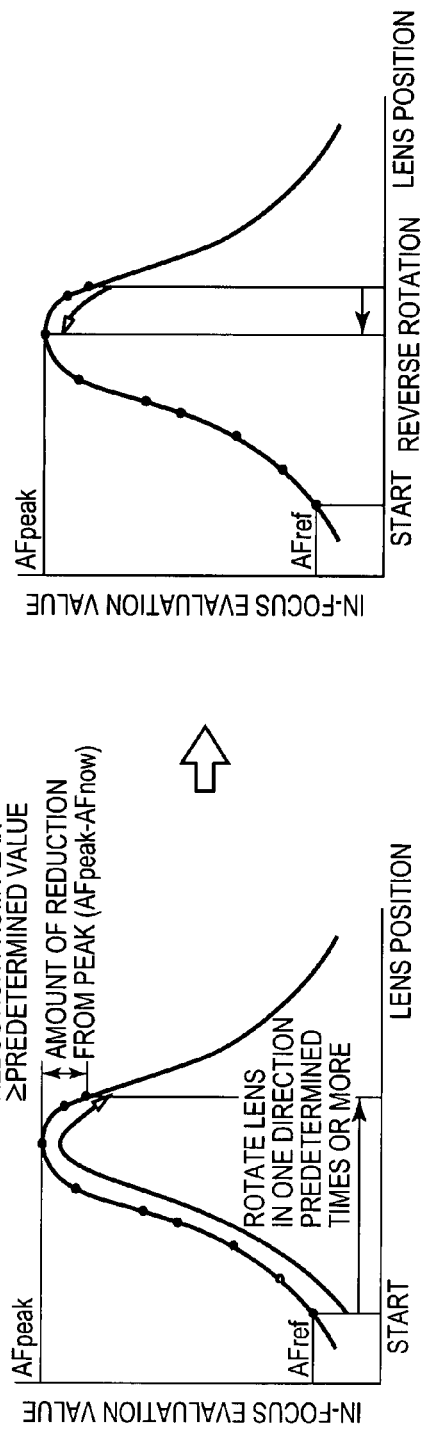
FIGS. 9A to 9B are graphs showing a peak-passing determination algorithm.
Figure 9B:
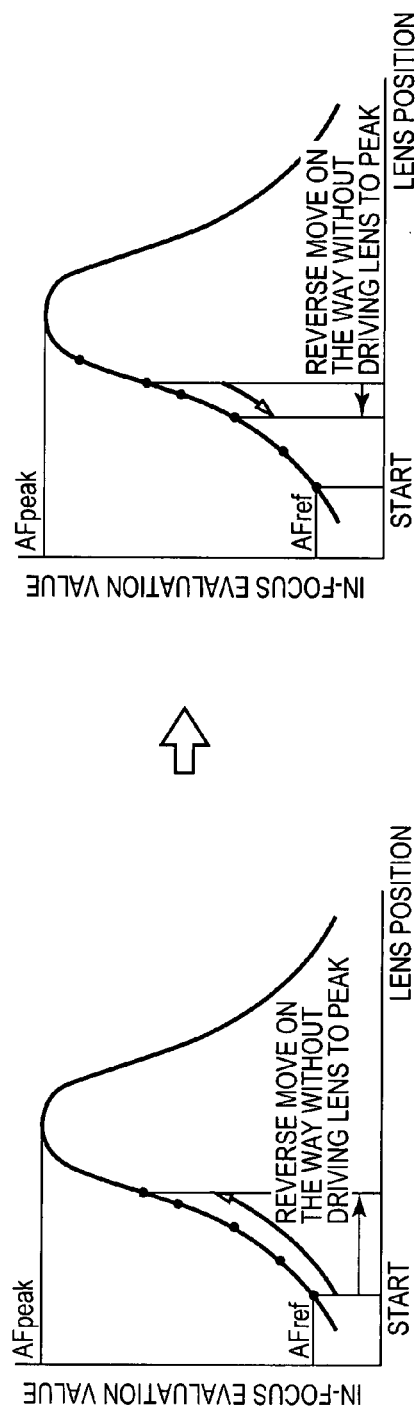

Referring next to FIGS. 9A and 9B, the peak detection algorithm will be described.

FIG. 9A contains graphs for explaining the peak detection algorithm when the user rotates the focus ring 106 in such a way that the peak detection algorithm can correctly determine that the peak has been passed. In other words, this example shows a case where the user rotates the focus ring 106 in one direction until it passes the peak. In this case, if the Bucom 201 determines that the in-focus evaluation value is reduced from the maximum value by a predetermined amount after passing the peak (i.e., when it determines that the value $AF_{peak} - AF_{now}$ becomes larger than a predetermined value), the indication format of the indicator bar 241 is changed.

Then, the user who recognizes from changing of the indication format of the indicator bar 241 that the in-focus evaluation value has passed its in-focus point rotates the focus ring 106 in reverse direction opposite to the direction before changing the indication format to move the lens position of the shooting optical system 102 to $AF_{peak}$ as the peak value of the in-focus evaluation value.

On the other hand, FIG. 9B contains graphs for explaining the peak detection algorithm when the user rotates the focus ring 106 in the reverse direction before reaching the peak. In this case, the Bucom 201 is required not to consider the in-focus evaluation value acquired immediately before the rotation in the reverse direction as its maximum value $AF_{peak}$. To this end, the Bucom 201 needs to determine that the focus ring 106 is rotated continuously only in one direction and that the in-focus evaluation value is monotonically increasing.

In other words, the Bucom 201 does not set the peak value of the in-focus evaluation value as $AF_{peak}$ unless the rotation direction of the focus ring 106 is the same before and after the in-focus evaluation value reaches its peak.

Here, the Bucom 201 can detect the rotation direction of the focus ring 106 through the Lucom 101 from the output of a circuit provided in the lens drive mechanism 103 to monitor the focus lens position and the rotation position of the focus ring (e.g., output pulse of a photointerpreter, output of an encoder, etc.). Thus, the Bucom 201 can detect the rotation direction of the focus ring 106 to make an adequate judgment on passing the peak.

Figure 10A:
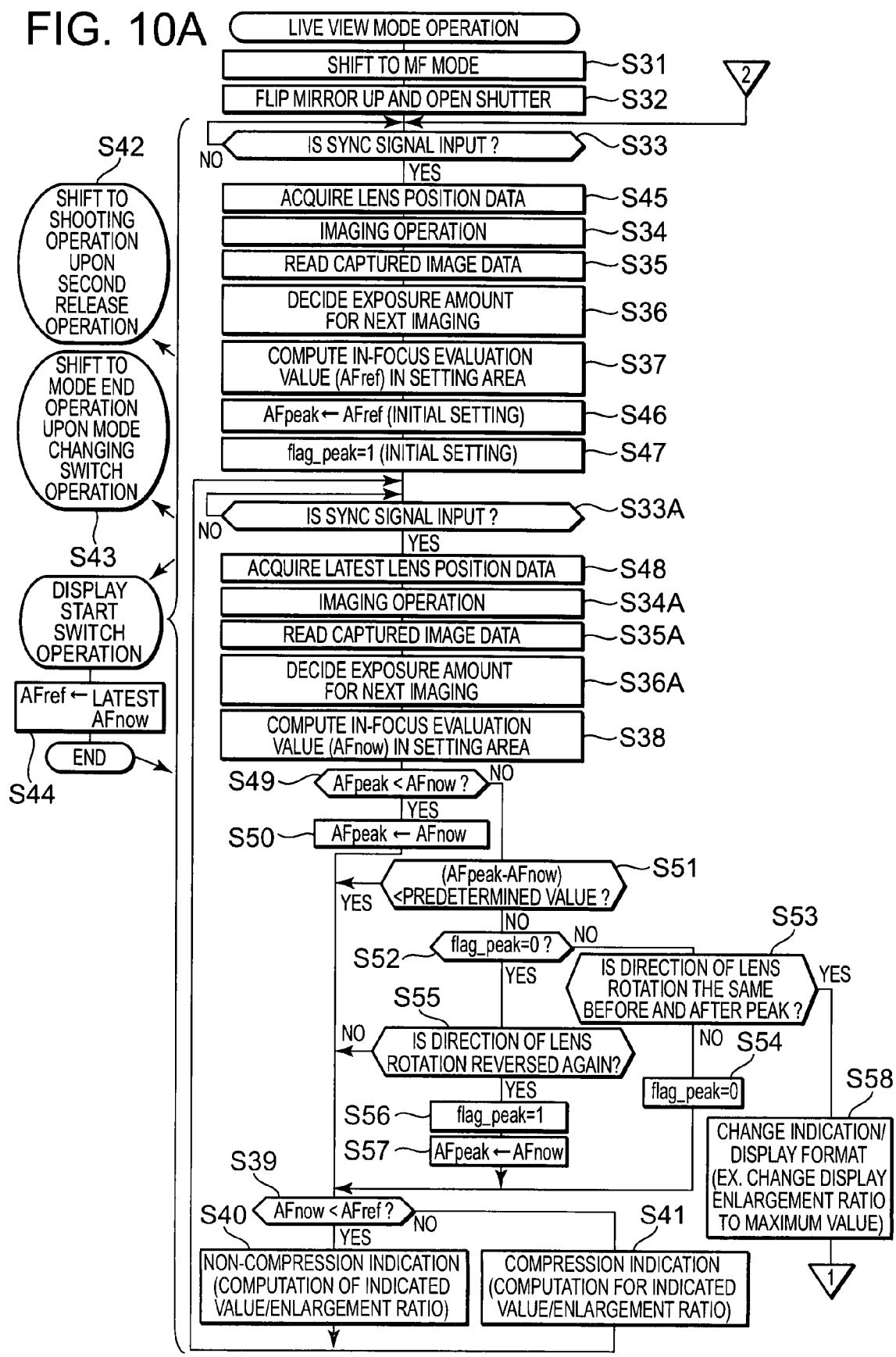
FIG. 10A is a first part of a flowchart showing operating control in the live view mode according to the second embodiment of the present invention.
Figure 10B:
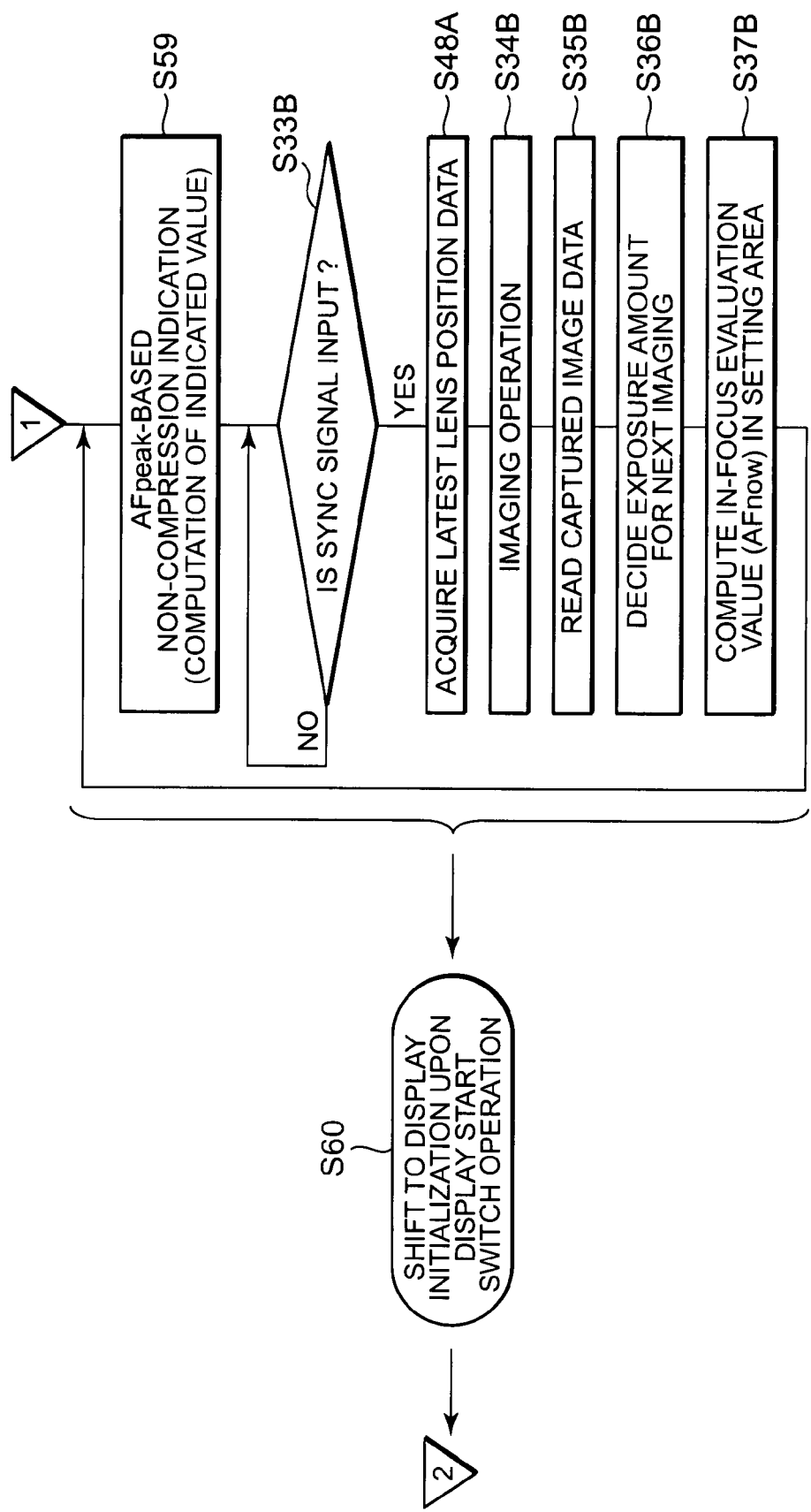
FIG. 10B is a second part of the flowchart showing operating control in the live view mode according to the second embodiment of the present invention.

Referring next to flowcharts shown in FIG. 10A and FIG. 10B, operating control performed by the Bucom 201 to actually indicate the in-focus evaluation value as shown in FIGS. 9A and 9B in the live view mode will be described. The flowcharts shown in FIGS. 10A and 10B are flowcharts showing the details of the processing in step S1 in the flowchart shown in FIG. 4A. Note that the same processing steps as those in the flowchart of FIG. 6 are given the same step numbers to omit redundant description.

First, if it is determined in step S33 that the sync signal is input, focus lens position data and rotation position data of the focus ring 106 are acquired from the Lucom 101 (step S45).

Further, the in-focus evaluation value in the setting area is computed in step S37, and after the computed value is set as the in-focus evaluation value $AF_{ref}$ as a reference later, the $AF_{peak}$ value is initialized to the initial value $AF_{ref}$ ($AF_{peak} = AF_{ref}$) of the in-focus evaluation value (step S46).

This $AF_{peak}$ value is used in step S49 to be described later. Then, a peak-passing flag flag_peak used for peak detection to be described later is initialized to 1 (step S47).

Then, in step S33A following upon the processing in step S47 and in which the same processing as in step S33 is performed, if it is determined that the sync signal is input, the latest focus lens position and rotation position data of the focus ring are acquired in the same manner as in step S45 (step S48).

After that, the same processing steps S34A to S36A as the above-mentioned processing steps S34 to S36 are executed. Then, in the above-mentioned step S38, the in-focus evaluation value in the setting area is computed, and the obtained value is set as the in-focus evaluation value $AF_{now}$. After that, the $AF_{now}$ value and the in-focus evaluation value $AF_{peak}$ value (initial value, which is set in step S46 and will be updated in step S50 to be described later) are compared in magnitude (step S49).

When the determination in step S49 turns to YES, it means that $AF_{peak} < AF_{now}$ and the in-focus evaluation value has not reached the peak value yet. In this case, $AF_{peak} = AF_{now}$ is assigned (step S50). After that, the procedure proceeds to step S39. Thus, the procedure continues to proceed along the path to step S50 until the in-focus evaluation value reaches the peak value.

On the other hand, when the determination in step S49 turns to NO, $AF_{peak} \geq AF_{now}$. In this case, it is determined whether the $AF_{peak} - AF_{now}$ value reaches a predetermined amount (i.e., whether $AF_{peak} - AF_{now} <$ predetermined value) (step S51).

When the determination in step S51 turns to YES, it means that the $AF_{peak} - AF_{now}$ value has not reached the predetermined amount, that is, that the in-focus evaluation value has passed the peak value but the in-focus evaluation value is reduced from the peak value only by a very small amount. In this case, the procedure proceeds to step S39.

In the meantime, when the determination in step S51 turns to NO, it means that the in-focus evaluation value is reduced appreciably from the peak value after the in-focus evaluation value has reached the peak value. In this case, the logic of the peak-passing flag flag_peak is determined (as to whether flag_peak=0) (step S52).

Here, if the focus ring 106 continues to be rotated after passing the peak value of the in-focus evaluation value for the first time since shifting to the live view mode, since flag_peak=1 is set in step S47, the determination in step S52 turns to NO and the procedure proceeds to step S53 to be described later.

When the determination in step S52 turns to NO, it means that the in-focus evaluation value is reduced appreciably after reaching its peak. In this case, it is determined whether the rotation direction of the focus ring 106 is the same before and after the peak value (step S53). This determination in step S53 is made with reference to the rotation position data of the focus ring 106 acquired in step S48, i.e., rotation position data of the focus ring 106 before and after the in-focus evaluation value becomes the peak value.

Further, in such a case that the focus ring 106 continues to be rotated only in a direction to reduce the in-focus evaluation value after shifting to the live view mode, the procedure also proceeds to step S53. At this time, the $AF_{peak}$ value is the value set in step S46 (i.e., the in-focus evaluation value $AF_{ref}$ upon shifting to the live view mode). Therefore, it cannot be said that the $AF_{peak}$ value at this time is the true peak value. In fact, since the determination in step S53 turns to NO in this case, the procedure proceeds to step S54 to be described below to perform appropriate processing.

In other words, when the determination in step S53 turns to NO, it means that the in-focus evaluation value is reduced appreciably from the peak value, and that the rotation direction of the focus ring 106 is not the same before and after the in-focus evaluation value reaches the peak value. In this case, the peak-passing flag is set as flag_peak=0 (step S54).

The case where the determination in step S53 turns to NO corresponds to a state shown in FIG. 10B. In this case, the $AF_{peak}$ value should be determined not to be the true peak value. Therefore, in this case, since the peak-passing flag is set as flag_peak=0 in step S54, the determination in step S52 for the next round results in turning to YES and hence proceeding to step S55.

On the other hand, when the determination in step S53 turns to YES, it means that it is determined in step S51 that the in-focus evaluation value is reduced appreciably after reaching the peak value and that it is determined in step S53 that the rotation direction of the focus ring 106 is the same before and after the in-focus evaluation value becomes the peak value. Since this case corresponds to the state shown in FIG. 9A, the indication format of the indicator bar 241 and the display format on the LCD monitor 222 are switched in the manner mentioned above with reference to FIGS. 8C and 8D (step S58). In other words, as mentioned above, the indication color of the indicator bar 241 is changed, the display color of the LCD monitor 222 is changed, and the enlargement ratio K is fixed to the maximum value.

Then, after switching the indication/display formats in step S58, the AF level value to be indicated as the indicator bar 241 is computed according to the equation (9) (step S59). In step S59, the non-compression computation using $AF_{now}/AF_{peak}$ is performed in the manner mentioned above.

After that, in the same processing step S33B as the above-mentioned processing step S33, if it is determined that the sync signal is input, the same processing step S48A as the above-mentioned processing step S48 is executed, and further the same processing steps S34B to S37B as the above-mentioned processing steps S34 to S37 are executed.

In the process of the sequence of processing operations from step S59 to step S37B, if the user presses the display start switch (not shown), the Bucom 201 performs interrupt processing and the procedure shifts to processing in step S60. This step S60 is a step of shifting to step S33 to perform processing for live view display again from the beginning (step S60). In other words, step S60 is to redo the live view display operation from the beginning after the peak-passing determination. Further, as interrupt processing in the process of performing the sequence of processing steps S59 through S37B, interrupt processing steps S42, S43, and S44 can, of course, be executed as well.

In the meantime, when the determination in step S52 turns to YES, it means that the user rotates the focus ring 106 in reverse direction before the in-focus evaluation value becomes the peak value. In this case, it is determined whether the rotation direction of the focus ring 106 is reversed again (i.e., whether the shooting optical system 102 is being moved again in the direction toward the peak value of the in-focus evaluation value) (step S55). Here, the determination in step S55 turns to NO until the rotation direction of the focus ring 106 is reversed again. In other words, the procedure always shifts to step S39 in this case.

On the other hand, when the determination in step S55 turns to YES, it means that the focus ring 106 is rotated in reverse direction before the in-focus evaluation value becomes the peak value, or that after the reverse rotation, the focus ring 106 is rotated again in the direction opposite to the reverse direction. In this case, the peak-passing flag flag_peak set to 0 in step S54 is set again to 1 (step S56). Then, after this step S56, the $AF_{now}$ value is set as the $AF_{peak}$ value to update $AF_{peak}$ (step S57).

As described above, according to the second embodiment, there can be provided an imaging apparatus having the following effects in addition to those of the imaging apparatus according to the first embodiment.

First, according to the imaging apparatus of the second embodiment, when the in-focus evaluation value has passed the peak value as a result of user's operation of the focus ring 106, since the indication/display formats of the indicator bar 241 and the LCD monitor 222 are switched, the user can immediately recognize that the in-focus evaluation value has passed the peak value. Further, as for the indication format after switched, since the indication of the indicator bar 241 is switched from the previous compression indication to the non-compression indication, the length of the indicator bar 241 which expands and contracts with changes in in-focus evaluation value increases, making it very easy for the user to achieve MF focusing while viewing the indicator bar 241. Then, when the in-focus evaluation value has passed the peak value, the enlargement ratio K for zoom-in display on the LCD monitor 222 is fixed to the maximum value, and this makes it easy fine MF focus adjustment while viewing the LCD monitor 222, thereby improving MF operationality.

Although the first embodiment and the second embodiment are described by taking, as an example, such a case where the imaging apparatus according to each of the embodiments is mounted in a lens interchangeable single-lens reflex camera, each of the embodiments can, of course, be applied to any other kind of camera having both a hill-climbing AF function and an MF function such as a still camera or camcorder.

Further, in the first embodiment and the second embodiment, an image in the area of the zoom-in box 230 is zoom-in displayed using the entire area of the display screen of the LCD monitor 222 (FIGS. 3A to 3C). However, the present invention is not limited thereto. For example, the image in the area of the zoom-in box 230 can be superimposed and displayed as one window on a normal live view image (having a size enough for the user to determine the layout of the image). On the contrary, the zoom-in display can be so provided that the image in the area of the zoom-in box 230 is displayed on the entire area of the LCD monitor 222 and the normal live view image is superimposed and displayed as a window on part of the zoomed-in image. In this case, the user can examine both the overall layout and the in-focus state at the same time.

In the first and/or second embodiment, since the image pickup device 212 captures images of the subject at predetermined intervals to acquire a moving image, it can be referred to as an imaging part. The LCD monitor 222 displays the moving image acquired by the image pickup device 212 as a live picture, so that it can be referred to as a display part. The lens drive mechanism 103 changes the focus position of the shooting optical system 102 in response to the user's rotation of the focus ring 106, so that it can be referred to as a focus position adjusting part. The Bucom 21 decides the size of the subject in the live picture to be displayed on the LCD monitor 222, so that it can be referred to as a display control part. The Bucom 21 also calculates, on a frame-by-frame basis, an in-focus evaluation value indicating an in-focus level of a predetermined portion in each frame upon live view display, so that it can also referred to as an in-focus evaluation value calculating part. The arrow pad 324 and the OK button 325 specify, as a first area, a portion of the display screen of the live picture displayed on the display part, so that they can be referred to as an area specification part. Further, the Bucom detects that the in-focus evaluation value has gone over the peak value in accordance with changes in the focus position of the shooting optical system, it can be referred to as a peak detection part.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An imaging apparatus for imaging a subject, comprising:
    a shooting optical system for forming an image of a light beam from the subject;
    an imaging part for capturing images of the subject at predetermined intervals to output a moving image;
    a display part for displaying, on a display, the moving image output from the imaging part as a live picture;
    a focus adjusting part for changing a focus position of the shooting optical system in accordance with an operation performed by a user;
    a display control part for deciding an enlargement ratio of the live picture to be displayed on the display by the display part; and
    an in-focus evaluation value calculating part for calculating an in-focus evaluation value indicating an in-focus level of each frame of the moving image output from the imaging part,
    wherein the display control part decides the enlargement ratio of the live picture to be displayed on the display based on the in-focus evaluation value.

2. The imaging apparatus according to claim 1, further comprising:
    an area specification part for specifying, as a first area, a portion of a display screen of the live picture displayed on the display by the display part,
    wherein the in-focus evaluation value calculating part calculates, for each frame of the live picture, the in-focus evaluation value in the area specified as the first area by the area specification part.

3. The imaging apparatus according to claim 2, wherein the display control part has a plurality of enlargement ratio computing functions indicating a relationship between the in-focus evaluation value and an enlargement ratio of the live picture to be displayed on the display, and based on the in-focus evaluation value, the display control part selects an enlargement ratio computing function to decide the enlargement ratio of the live picture to be displayed on the display using the selected enlargement ratio computing function.

4. The imaging apparatus according to claim 2, further comprising
    a peak detection part for detecting that the in-focus evaluation value has passed a peak in accordance with changes in focus position of the shooting optical system,
    wherein the display control part has a plurality of enlargement ratio computing functions indicating a relationship between the in-focus evaluation value and an enlargement ratio of the live picture to be displayed on the display, and at a time point when the peak detection part detects that the in-focus evaluation value has passed the peak, the display control part newly selects an enlargement ratio computing function to decide the enlargement ratio of the live picture to be displayed on the display using the newly selected enlargement ratio computing function.

5. The imaging apparatus according to claim 1, further comprising
an indicator generation part for generating an indicator for indicating the in-focus evaluation value in a graphic form,
wherein the display control part decides the enlargement ratio of the live picture to be displayed on the display, while it decides a shape of the graphic form generated by the indicator generation part according to the in-focus evaluation value, and an indication format of the graphic form, and
the display part displays the live picture on the display, while it displays the indicator generated by the indicator generation part.

6. The imaging apparatus according to claim 1, further comprising
a peak detection part for detecting that the in-focus evaluation value has passed a peak,
wherein when the peak detection part detects that the in-focus evaluation value has passed the peak, the display control part changes a display format of the live picture to be displayed on the display by the display part to a display format different from the display format upon detection.

7. The imaging apparatus according to claim 6, wherein changing of the display format of the live picture means that color balance in at least a portion of the display screen of the live picture to be displayed by the display part is changed.

8. An imaging apparatus comprising:
an image pickup device;
a shooting optical system for forming an image of light from a subject on the image pickup device and capable of performing a manual focus operation;
an image processing controller for processing electric signals output from the image pickup device at predetermined intervals to output a moving image;
a computer for detecting, in a portion of each frame of the moving image, a change in in-focus state of the imaging optical system in response to the manual focus operation to zoom in the moving image at an enlargement ratio successively changed with changes in the in-focus state; and
a monitor for displaying the zoomed-in moving image.

9. A live view display method for displaying a live view image on a display of a camera comprising;
capturing images, which is formed by a shooting optical system of the camera, at predetermined intervals to output as a moving image;
moving a focus position of the shooting optical system that is changed in accordance with an operation performed by a user;
calculating an in-focus value indicating an in-focus state of each frame of the moving image;
creating a live picture from the moving image by trimming or resizing each frame of the moving image at an enlargement ratio according to the calculated in-focus value; and
displaying the created live picture on the display.

* * * * *